US008000737B2

(12) United States Patent
Caimi et al.

(10) Patent No.: US 8,000,737 B2
(45) Date of Patent: Aug. 16, 2011

(54) METHODS AND APPARATUSES FOR ADAPTIVELY CONTROLLING ANTENNA PARAMETERS TO ENHANCE EFFICIENCY AND MAINTAIN ANTENNA SIZE COMPACTNESS

(75) Inventors: Frank M. Caimi, Vero Beach, FL (US); Gregory A. O'Neill, Jr., Rockledge, FL (US); Ping Chen, Greensboro, NC (US); Young-Min Jo, Viera, FL (US)

(73) Assignee: Sky Cross, Inc., Melbourne, FL (US)

( * ) Notice: Subject to any disclaimer, the term of this patent is extended or adjusted under 35 U.S.C. 154(b) by 1175 days.

(21) Appl. No.: 11/623,307

(22) Filed: Jan. 15, 2007

(65) Prior Publication Data

US 2007/0222697 A1 Sep. 27, 2007

Related U.S. Application Data

(63) Continuation-in-part of application No. 11/421,878, filed on Jun. 2, 2006, now Pat. No. 7,834,813, which is a continuation-in-part of application No. 11/252,248, filed on Oct. 17, 2005, now Pat. No. 7,663,555.

(60) Provisional application No. 60/619,231, filed on Oct. 15, 2004.

(51) Int. Cl.
*H04M 1/00* (2006.01)
*H04B 1/04* (2006.01)
*H04Q 11/12* (2006.01)

(52) U.S. Cl. .................... 455/550.1; 455/103; 455/127.3

(58) Field of Classification Search .................... 455/73, 455/77, 82, 83, 550.1, 553.1, 561, 91, 101, 455/102, 103, 121, 127.3

See application file for complete search history.

(56) References Cited

U.S. PATENT DOCUMENTS 4,165,493 A 8/1979 Harrington (Continued)

FOREIGN PATENT DOCUMENTS

EP EP1271691 A2 1/2003

(Continued)

OTHER PUBLICATIONS

Pan, Helen K. et at., RF MEMS Integration in Reconfigurable Bent Monopole Antenna Design, 2006 National Radio Science Meeting, Abstract, 1 pg.

(Continued)

*Primary Examiner* — Andrew Wendell

(74) *Attorney, Agent, or Firm* — John L. DeAngelis; Beusse Wolter Sanks Mora & Maire, P.A.

(57) ABSTRACT

A communications apparatus comprising a first antenna, a first serial configuration of a first power amplifier and a first matching network, a second serial configuration of a second power amplifier and a second matching network, a switching element for switchably selecting the first or the second serial configuration for supplying a signal to the first antenna, the first and the second power amplifiers supplying a respective first signal of a first power and a second signal of a second power different than the first power to the first antenna for transmitting and the first and the second matching networks presenting respective first and second impedances to the respective first and second power amplifiers, the first and the second impedances responsive respectively to a power-related parameter of the first and the second signals.

3 Claims, 20 Drawing Sheets

U.S. PATENT DOCUMENTS

| | | | | |
|---|---|---|---|---|
| 4,564,843 | A | 1/1986 | Cooper | |
| 5,155,493 | A | 10/1992 | Thursby et al. | |
| 5,361,403 | A | 11/1994 | Dent | |
| 5,423,074 | A | 6/1995 | Dent | |
| 5,771,444 | A | 6/1998 | Dent et al. | |
| 5,778,308 | A | 7/1998 | Sroka et al. | |
| 5,832,374 | A | 11/1998 | Birth et al. | |
| 5,842,140 | A | 11/1998 | Dent et al. | |
| 5,874,919 | A | 2/1999 | Rawnick et al. | |
| 5,926,147 | A | 7/1999 | Sehm et al. | |
| 5,973,568 | A * | 10/1999 | Shapiro et al. | 330/295 |
| 5,991,608 | A | 11/1999 | Leyten | |
| 6,028,564 | A | 2/2000 | Duan et al. | |
| 6,097,347 | A | 8/2000 | Duan et al. | |
| 6,178,313 | B1 | 1/2001 | Mages et al. | |
| 6,489,843 | B1 * | 12/2002 | Nishijima et al. | 330/51 |
| 6,535,175 | B2 | 3/2003 | Brady et al. | |
| 6,650,295 | B2 | 11/2003 | Ollikainen et al. | |
| 6,693,594 | B2 | 2/2004 | Pankinaho et al. | |
| 6,759,988 | B2 | 7/2004 | Purr et al. | |
| 6,784,844 | B1 | 8/2004 | Boakes et al. | |
| 6,798,287 | B2 * | 9/2004 | Wu et al. | 330/129 |
| 6,845,126 | B2 | 1/2005 | Dent et al. | |
| 6,889,034 | B1 | 5/2005 | Dent | |
| 6,895,225 | B1 | 5/2005 | Talvitie et al. | |
| 6,903,687 | B1 | 6/2005 | Fink et al. | |
| 6,904,296 | B2 | 6/2005 | Geeraert et al. | |
| 6,961,368 | B2 | 11/2005 | Dent et al. | |
| 6,980,831 | B2 * | 12/2005 | Matsuyoshi et al. | 455/561 |
| 7,002,519 | B2 | 2/2006 | Wang et al. | |
| 2004/0145523 | A1 | 7/2004 | Shamblin et al. | |
| 2004/0201423 | A1 * | 10/2004 | Weigand et al. | 330/307 |
| 2005/0085196 | A1 * | 4/2005 | Amano | 455/101 |
| 2005/0181746 | A1 * | 8/2005 | Wight | 455/91 |
| 2005/0186931 | A1 | 8/2005 | Laiho et al. | |
| 2005/0215206 | A1 * | 9/2005 | Granstrom et al. | 455/102 |
| 2005/0237251 | A1 | 10/2005 | Boyle et al. | |
| 2005/0264455 | A1 | 12/2005 | Talvitie et al. | |
| 2005/0270105 | A1 | 12/2005 | Van Bezooijen et al. | |
| 2006/0017635 | A1 | 1/2006 | Zheng | |
| 2006/0066490 | A1 | 3/2006 | Ku et al. | |
| 2006/0099921 | A1 | 5/2006 | Hong et al. | |

FOREIGN PATENT DOCUMENTS

| | | | |
|---|---|---|---|
| EP | 1429472 | * | 6/2004 |

OTHER PUBLICATIONS

Han, Yongping et al., Towards Multi-Service Wireless Universal Receiver, 2006 National Radio Science Meeting, Abstract, 1 pg.

Zhang, Chunna et al., Compact Novel Reconfigurable Antennas for Multi-Band Operation, 2006 National Radio Science Meeting, Abstract, 1 pg.

Vainikainen, Pertti, et al., Resonator-Based Analysis of the Combination of Mobile Handset Antenna and Chassis, IEEE Transactions on Antennas and Propagation vol. 50, No. 10, pp. 1433-1444, Oct. 2002 1.

Raisanen, Anttl V. et al., Hut Radio Laboratory Research and Education 2002, Abstract. 1 pg.

Nikolaou, Symeon, Design of Reconfigurable Annular Slot Antenna for Wireless Communications/WLAN Applications, A Thesis Presented to the Academic Faculty, Georgia Institute of Technology, Dec. 2005.

* cited by examiner

METHODS AND APPARATUSES FOR ADAPTIVELY CONTROLLING ANTENNA PARAMETERS TO ENHANCE EFFICIENCY AND MAINTAIN ANTENNA SIZE COMPACTNESS

This is a continuation-in-part application claiming the benefit of U.S. Patent Application assigned application Ser. No. 11/421,878, filed on Jun. 2, 2006 now U.S. Pat. No. 7,834, 813, which is a continuation-in-part application claiming the benefit of U.S. Patent Application assigned application Ser. No. 11/252,248 filed on Oct. 17, 2005 now U.S. Pat. No. 7,663,555, which claims the benefit of the Provisional Patent Application No. 60/619,231 filed on Oct. 15, 2004.

FIELD OF THE INVENTION

The present invention is related generally to antennas for wireless communications devices and specifically to methods and apparatuses for adaptively controlling antenna parameters to improve performance of the communications device.

BACKGROUND OF THE INVENTION

It is known that antenna performance is dependent on the size, shape and material composition of the antenna elements, the interaction between elements and the relationship between certain antenna physical parameters (e.g., length for a linear antenna and diameter for a loop antenna) and the wavelength of the signal received or transmitted by the antenna. These physical and electrical characteristics determine several antenna operational parameters, including input impedance, gain, directivity, signal polarization, resonant frequency, bandwidth and radiation pattern. Since the antenna is an integral element of a signal receive and transmit path of a communications device, antenna performance directly affects device performance.

Generally, an operable antenna should have a minimum physical antenna dimension on the order of a half wavelength (or a multiple thereof) of the operating frequency to limit energy dissipated in resistive losses and maximize transmitted or received energy. Due to the effect of a ground plane image, a quarter wavelength antenna (or odd integer multiples thereof) operative above a ground plane exhibits properties similar to a half wavelength antenna. Communications device product designers prefer an efficient antenna that is capable of wide bandwidth and/or multiple frequency band operation, electrically matched (e.g., impedance matching) to the transmitting and receiving components of the communications system, and operable in multiple modes (e.g., selectable signal polarizatons and selectable radiation patterns).

The half-wavelength dipole antenna is commonly used in many applications. The radiation pattern is the familiar donut shape with most of the energy radiated uniformly in the azimuth direction and little radiation in the elevation direction. Frequency bands of interest for certain communications devices are 1710 to 1990 MHz and 2110 to 2200 MHz. A half-wavelength dipole antenna is approximately 3.11 inches long at 1900 MHz, 3.45 inches long at 1710 MHz, and 2.68 inches long at 2200 MHz. The typical gain is about 2.15 dBi.

The quarter-wavelength monopole antenna disposed above a ground plane is derived from the half-wavelength dipole. The physical antenna length is a quarter-wavelength, but interaction of the electromagnetic energy with the ground plane (creating an image antenna) causes the antenna to exhibit half-wvavelength dipole performance. Thus, the radiation pattern for a monopole antenna above a ground plane is similar to the half-wavelength dipole pattern, with a typical gain of approximately 2 dBi.

The common free space (i.e., not above ground plane) loop antenna (with a diameter of approximately one-third the wavelength of the transmitted or received frequency) also displays the familiar donut radiation pattern along the radial axis, with a gain of approximately 3.1 dBi. At 1900 MHz, this antenna has a diameter of about 2 inches. The typical loop antenna input impedance is 50 ohms, providing good matching characteristics to the standard 50 ohm transmission line.

The well-known patch antenna provides directional hemispherical coverage with a gain of approximately 4.7 dBi. Although small compared to a quarter or half wavelength antenna, the patch antenna has a relatively narrow bandwidth. The small size is only attributable to the velocity of propagation associated with the dielectric material used between the plates of the patch antenna.

Given the advantageous performance of quarter and half wavelength antennas, conventional antennas are typically constructed so that the antenna length is on the order of a quarter wavelength of the radiating frequency and the antenna is operated over a ground plane, or the antenna length is a half wavelength without employing a ground plane. These dimensions allow the antenna to be easily excited and operated at or near a resonant frequency (where the resonant frequency (f) is determined according to the equation $c=\lambda F$, where c is the speed of light and $\lambda$ is the wavelength of the electromagnetic radiation). Half and quarter wavelength antennas limit energy dissipated in resistive losses and maximize the transmitted energy. But as the operational frequency increases/decreases, the operational wavelength decreases/increases and the antenna element dimensions proportionally decrease/increase. In particular, as the resonant frequency of the received or transmitted signal decreases, the dimensions of the quarter wavelength and half wavelength antenna proportionally increase. The resulting larger antenna, even at a quarter wavelength, may not be suitable for use with certain communications devices, especially portable and personal communications devices intended to be cared by a user. Since these antennas tend to be larger than the communications device, they are typically mounted with a portion of the antenna protruding from the communications device and thus are susceptible to breakage.

The burgeoning growth of wireless communications devices and systems has created a substantial need for physically smaller, less obtrusive, and more efficient antennas that are capable of wide bandwidth or multiple frequency-band operation, and/or operation in multiple modes (i.e., selectable radiation patterns or selectable signal polarizations). For example, operation in multiple frequency bands may be required for operation of the communications device with multiple communications systems or signal protocols within different frequency bands. For example, a cellular telephone system transmitter/receiver and a global positioning system receiver operate in different frequency bands using different signal protocols. Operation of the device in multiple countries also requires multiple frequency band operation since communications frequencies are not commonly assigned in different countries.

Smaller packaging of state-of-the-art communications devices, such as personal communications handsets, does not provide sufficient space for the conventional quarter and half wavelength antenna elements. Physically smaller antennas operable in the frequency bands of interest (i.e., exhibiting multiple resonant frequencies and/or wide bandwidth to cover all operating frequencies of the communications device) and providing the other desired antenna-operating properties (input impedance, radiation pattern, signal polarizations, etc.) are especially sought after.

As is known to those skilled in the art, there is a direct relationship between physical antenna size and antenna gain, at least with respect to a single-element antenna, according to the relationship: gain=(βR)^2+2βR , where R is the radius of the sphere containing the antenna and β is the propagation factor. Increased gain thus requires a physically larger antenna, while users continue to demand physically smaller handsets that in turn require smaller antennas. As a further constraint, to simplify the system design and strive for minimum cost, equipment designers and system operators prefer to utilize antennas capable of efficient multi-band and/or wide bandwidth operation to allow the communications device to access various wireless services operating within different frequency bands or such services operating over wide bandwidths. Finally, gain is limited by the known relationship between the antenna operating frequency and the effective antenna electrical length (expressed in wavelengths). That is, the antenna gain is constant for all quarter wavelength antennas of a specific geometry i.e., at that operating frequency where the effective antenna length is a quarter of a wavelength of the operating frequency.

To overcome the antenna size limitations imposed by handset and personal communications devices, antenna designers have turned to the use of so-called slow wave structures where the structure's physical dimensions are not equal to the effective electrical dimensions. Recall that the effective antenna dimensions should be on the order of a half wavelength (or a quarter wavelength above a ground plane) to achieve the beneficial radiating and low loss properties discussed above. Generally, a slow-wave structure is defined as one in which the phase velocity of the traveling wave is less than the free space velocity of light. The wave velocity (c) is the product of the wavelength and the frequency and takes into account the material permittivity and permeability, i.e., $c/((sqrt(\in_r)sqrt(\mu_r))=\lambda f$. Since the frequency does not change during propagation through a slow wave structure, if the wave travels slower (i.e., the phase velocity is lower) than the speed of light, the wavelength within the structure is lower than the free space wavelength. The slow-wave structure de-couples the conventional relationship between physical length, resonant frequency and wavelength.

Since the phase velocity of a wave propagating in a slow-wave structure is less than the free space velocity of light, the effective electrical length of these structures is greater than the effective electrical length of a structure propagating a wave at the speed of light. The resulting resonant frequency for the slow-wave structure is correspondingly increased. Thus if two structures are to operate at the same resonant frequency, as a half-wave dipole, for instance, then the structure propagating a slow wave will be physically smaller than the structure propagating a wave at the speed of light. Such slow wave structures can be used as antenna elements or as antenna radiating structures.

As designers of portable communications devices (e.g., cellular handsets) continue to shrink device size while offering more operating features, the requirements for antenna performance become more stringent. Achieving the next level of performance for such communications devices requires smaller antennas with improved performance, especially with respect to radiation efficiency. Currently, designers struggle to obtain adequate multi-band antenna performance for the multi-band features of the devices. But as is known, efficiency and bandwidth are related and a design trade-off is therefore required. Designers can optimize performance in one (or in some cases more than one) operating frequency band, but usually must compromises the efficiency or bandwidth to achieve adequate performance in two or more bands simultaneously. However, most portable communications devices seldom require operation in more than one band at any given time.

In addition, modern portable communications devices must maintain size compactness and high efficiency while sill attempting to provide adequate operating time with a limited battery resource. Antenna compactness and efficiency are therefore crucial to achieving commercially viable wireless devices.

The known Chu-Harrington relationship relates the size and bandwidth of an antenna. Generally, as the size decreases the antenna bandwidth also decreases. But to the contrary, as the capabilities of handset communications devices expand to provide for higher data rates and the reception of bandwidth intensive information (e.g., strewing video), the antenna bandwidth must be increased.

Current wireless communications devices operating according to the various common communications signal protocols, e.g., GSM, EDGE, CDMA, Bluetooth. 802.11× and, UWB and WCDMA, suffer operating deficiencies as set forth below.

A. Poor power amplifier CA) efficiency due to sub-optimal PA load impedance (where the antenna impedance is the PA load impedance) as the PA's output power changes during operation of the communications device and as the antenna impedance change as the signal frequency changes.

B. Poor PA efficiency as set forth in A. above as further affected by the antenna's relatively narrow bandwidth due its relatively small size to fit within the available space envelope of the communications device (i.e., the Chu-Harrington limitation).

C. Poor PA efficiency due to a sub-optimal PA load impedance as the hand-effect or proximity effect detunes the antenna resonant frequency and/or modifies the antenna impedance.

D. Loss of radiative energy transfer (coupling efficiency) due to a sub-optimal PA output impedance (i.e., a sub-optimal antenna impedance) due to the use of a relatively small antenna and it corresponding relatively narrow bandwidth.

E. Loss of radiative energy transfer (coupling efficiency) due to detuning of the antenna resonant frequency caused by the hand-effect or proximity effect.

F. Poor PA efficiency due to impedance transformation to a higher value (i.e., 50 ohms) versus a lower value closer to the natural radiation resistance of the antenna.

G. Poor efficiency due to impedance transformation from a lower impedance (the impedance of the PA at rated power) to a higher impedance (50 ohms for example) characteristic of filters, antennas and other components operative with the PA.

The teachings of the present invention are intended to overcome one or more of these disadvantages and thereby improve operation of the communications device.

BRIEF DESCRIPTION OF THE INVENTION

According to one embodiment, the invention comprises a communications apparatus further comprising a first antenna, a first serial configuration of a first power amplifier and a first matching network, a second serial configuration of a second power amplifier and a second matching network, a switching element for switchably selecting the first or the second serial configuration for supplying a signal to the first antenna, the first and the second power amplifiers supplying a respective first signal of a first power and a second signal of a second power different than the first power to the first antenna for transmitting and the first and the second matching networks presenting respective first and second impedances to the respective first and second power amplifiers, the first and the second impedances responsive respectively to a power-related parameter of the first and the second signals.

According to another embodiment, the invention comprises a communications apparatus further comprising a transmitting antenna, a receiving antenna, a first serial configuration of a first power amplifier and a first matching network for producing a first signal, the first power amplifier operating in a first frequency band, a second serial configuration of a second power amplifier and a second matching network for producing a second signal the second power amplifier operating in a second frequency band, a first switching element for switchably supplying the first signal or the second signal to the transmitting antenna, a first receiver, a second receiver and a second switching element for switchably directing a signal received at the receiving antenna to the first receiver or the second receiver.

BRIEF DESCRIPTION OF THE DRAWINGS

The present invention can be more easily understood and the advantages and uses thereof more readily apparent when the following detailed description of the present invention is read in conjunction with the figures wherein.

In accordance with common practice, the various described device features are not drawn to scale, but are drawn to emphasize specific features relevant to the invention. Like reference characters denote like elements throughout the figures and text.

DETAILED DESCRIPTION OF THE INVENTION

Figure 1:
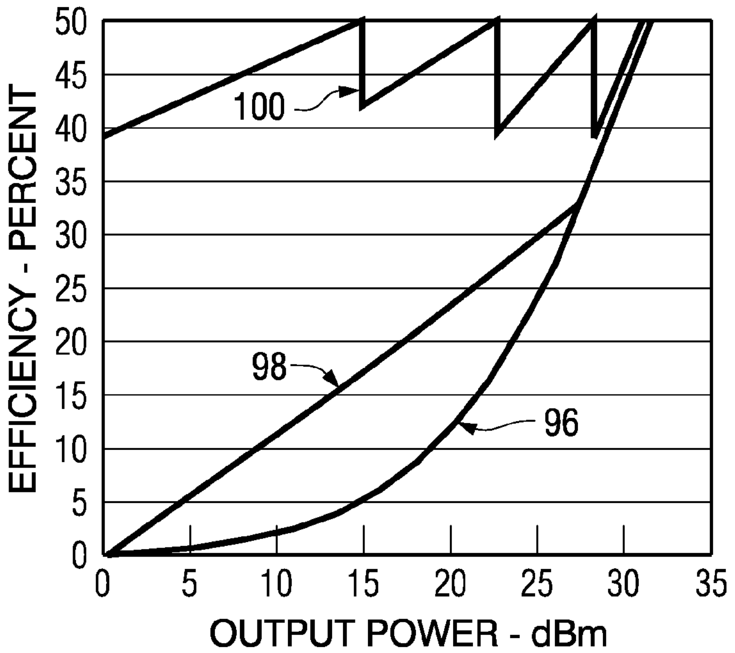
FIG. 1 is a graph illustrating power amplifier efficiency as a function of power amplifier output power

Before describing in detail the exemplary methods and apparatuses related to controlling antenna structures and operating parameters, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

Antenna tuning control techniques are known in the art to provide mule-band antenna performance for a multi-band communications device. The present invention teaches antenna control methods and apparatuses that overcome sub-optimal antenna impedance (introduced by the antenna tuning process) and frequency detuning effects that impair performance of the communications device.

According to one embodiment of the present invention, an antenna is tuned (by controlling its effective electrical length) to a desired resonant frequency to obviate resonance detuning caused by the operating environment of the antenna. Retuning the antenna improves the antenna's performance and thus improves performance of the communications device.

It is known that the transmitting power amplifier (PA) of a communications device is designed to provide a controllable output power to its load (i.e., the antenna) and to present a desired output impedance (typically 50 ohms including any impedance transformation elements). The output power range for which the power amplifier is designed depends on the operating environment and the signal protocols employed by the device. The output power is controlled by device components to permit effective communications with a receiving device. For example, an output power of a cellular handset PA is controlled to communicate effectively with a cellular base station as the handset moves about the base station coverage area.

In the prior art the PA efficiency changes as the power supplied by the PA to a fixed load impedance (i.e., a fixed antenna impedance) changes. Further, the PA output power, and thus the PA efficiency, varies responsive to changes in the load impedance (the antenna impedance). It is known that although the antenna is designed to present a nominal 50 ohm impedance, in fact the impedance varies with signal frequency. For example, the antenna impedance changes when the signal frequency shifts from the antenna resonant frequency that is near the center of the antenna's operating frequency band to a signal frequency near a band edge. Since the antenna impedance changes with signal frequency, it is impossible to substantially exactly match the PA output impedance to the antenna impedance over the operating frequency band. Thus according to the prior art the best that can be expected is to establish a PA output impedance at the conventional 50 ohms, design the antenna for a 50 ohm impedance at the resonant frequency and recognize that inefficiencies are introduced into the system when the signal frequency differs from the resonant frequency. In summary, in the prior art the PA efficiency may decline as the PA output power changes and as the signal frequency changes. Reduced output power efficiency requires more battery power and thus reduces battery life.

According to another embodiment of the present invention, the antenna impedance (the PA load impedance) is controlled to present an impedance to the PA that improves a power added efficiency PAE) of the power amplifier at a commanded PA radio frequency (RF) output power. That is, the antenna impedance is controlled as a function of the PA output power. Controlling the load impedance to present a desired impedance value from a range of impedance values permits the PA output voltage and current (which determine the PA output power) to range over values that can be supplied by the PA power supply, improving the efficiency at any commanded power level. Since many communications devices operate on battery power, improving the efficiency extends "talk time" (for a specific battery size) between battery recharges. Also, controlling the antenna goad) impedance overcomes the effects of naturally occurring antenna impedance variations as the signal frequency changes.

Yet another embodiment of the present invention controls both the antenna resonant frequency and impedance to obtain the combined advantages of both techniques.

Note that this impedance control technique of the present invention differs from the prior art impedance matching techniques of a complex conjugate match (i.e., an output impedance of a first component is a complex conjugate of an input impedance of a second component to which it is connected). These prior art techniques are intended to maximize power transfer from the first component to the second component at one specific frequency, since the impedance value is frequency dependent.

Although there are many measures of PA efficiency for consideration in the context of the present invention and all are considered within the scope of the present invention, the preferred measure appears to be power added efficiency (PAE), defined as the RF output power less the RE power input to the PA, the resulting quantity divided by the sum of the DC power supplied to the PA (i.e., a product of the DC current and the DC voltage) and the RF input power. Additional measures of PA efficiency (also expressed as PA gain) can be found at page 63 of the reference entitled "Microwave Circuit Design Using Linear Techniques and Nonlinear Techniques," by Vendelin, Pavio and Rohde.

Generally according to the prior art' the PA output impedance is a few ohms (3Ω for a common PA topology), and must be transformed (by an impedance matching circuit interposed between the PA and the amplifier) to the input impedance of the antenna, nominally 50Ω. Given this requirement for a relatively large impedance transformation, the reactive network required to make the transformation has a relatively narrow bandwidth. Since this specific impedance transformation is not required according to the present invention, the bandwidth-narrowing effects of the narrow bandwidth transformation components are reduced.

FIG. 1 illustrates a graph of power amplifier PAE as a function of power amplifier output power (in dBm) for a fixed load impedance. At maximum power output, the power amplifier PAE is about 50% (the theoretical maximum efficiency for a power amplifier operating in a class A mode). As the power output is reduced, the PAE drops. A curve 96 depicts this PAE reduction when the PA has a fixed DC bins and supplies a signal to a fixed-impedance, such as a fixed 50 ohm antenna load impedance. A low PAE is not desired as the PA does not utilize the available power supply voltage to drive the load.

A curve 98 depicts the improved PAE attainable for a PA augmented with a DC-DC converter, i.e., to control the DC bias voltage supplied to the PA as the power output decreases. A DC-to-DC converter responsive to a fixed DC supply voltage generates a controllable DC voltage for biasing the PA responsive to the PA power output. This technique increases the PAE as indicated by the curve 98 depicting a higher PAE than the curve 96. But this approach requires additional components and adds complexity to the PA and the communications device with which it operates.

It is noted that most cellular phones and other wireless communications devices commonly operate at moderate power levels. Statistically, GSM handsets operate at an average output power of about 18 dim, where the PAE is typically less than 25% according to prior art impedance matching techniques as illustrated in FIG. 1.

To solve the problem of PA inefficiencies associated with power output level variation and the resulting inefficiencies (i.e., reduced "talk-time") in operation of the communications device, in one embodiment the present invention provides dynamic and adaptive control of the PA load impedance (i.e., the antenna impedance) responsive to the power output level of the PA.

In one embodiment the antenna impedance is adjusted, according to techniques described below, to improves the PA load impedance (the antenna impedance) responsive to the PA output power level as the PAE falls during operation of the communications device. Control of the PA according to the present invention is intended to permit the PA to use all available power supply voltage/current to amplify the input signal (less any voltage that would cause the PA to saturate and clip the input signal) and extend battery life and talk-time for those communications devices operating on battery power. Other parameters related to the output power of the PA (the power of the output signal from the PA) can be used to control the antenna impedance, including the peak DC current in the PA output signal.

As depicted by a curve 100 in FIG. 1, in one embodiment the present invention adjusts the antenna impedance (antenna terminal impedance) in discrete steps between a first PAE level of 40% and a second PAE of about 50%, responsive to the commanded output power. As the PAE falls to about 40%, the antenna impedance (the load impedance to the PA) is adjusted to rise the PA PAE back to about 50%. The present invention therefore provides a better PAE than offered by the prior art techniques. Control of the PA load impedance according to the teachings of the present invention can be accomplished in discrete impedance value steps, as indicated in FIG. 1, or substantially continuously over a range of allowable and attainable impedance values.

The PAE values depicted in FIG. 1 are merely exemplary, as it is known that the actual PAE and the theoretical maximum possible PAE are determined by many factors, including the communications protocol and the power amplifier design. Also, the PA output power may be limited by the available current and voltage supplied by the power supply. As illustrated in FIG. 1, the PAE is improved at power levels from about 0 to about 30 dBm, although the technique can be applied generally to PA's operating at any power level. Also, the PA PAE can be improved continuously, rather than discretely as depicted, by continuously modifying the antenna impedance in response to PA output power level changes. In one embodiment of the invention, the impedance control is accomplished by modifying antenna structural features as described elsewhere herein.

Certain communications devices comprise an impedance conversion element between the PA and the antenna. Thus according to another embodiment of the present invention, in lieu of controlling the antenna impedance to control the PA efficiency, an impedance presented to the PA by the impedance conversion element is controlled to control the PA efficiency.

Figure 2:
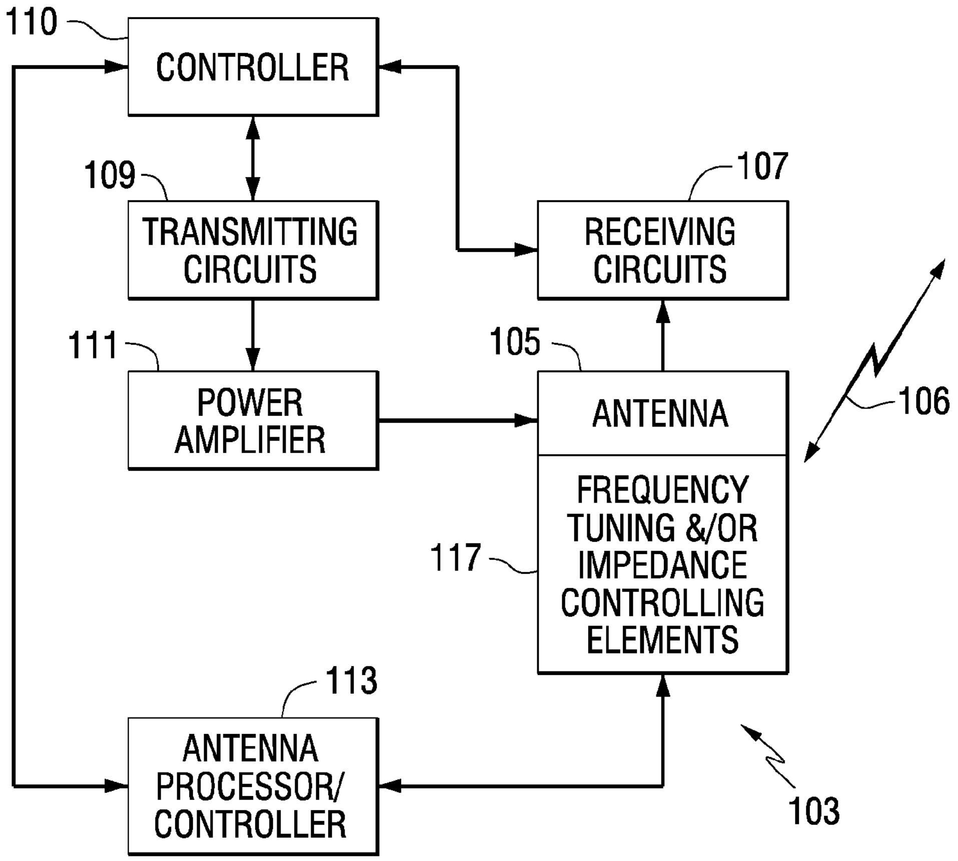
FIGS. 2 and 3 are block diagrams of communications devices according to the teachings of the present invention.

In another embodiment of the present invention a processor or controller controls one or more antenna elements or antenna components for frequency tuning the antenna and/or for modifying the antenna's impedance. FIG. 2 illustrates a communications device 103 comprising an antenna 105 for receiving and transmitting information signals over a radio frequency link 106. In one embodiment, the communications device 103 comprises a cellular telephone handset. Signals received by the antenna 105 are processed by receiving circuits 107 to extract information contained therein. Information signals for transmitting by the antenna 105 are produced in the transmitting circuits 109 and supplied to the antenna 105, via a power amplifier 111, for transmitting over the radio frequency link 106. A controller 110 controls the receiving and transmitting circuits 107/109.

An antenna processor/controller 113 (e.g., an antenna controller) is responsive to a signal supplied by the controller 110 (or alternatively is responsive to the transmitting circuits 109 or the power amplifier 111) that indicates operational parameters of the communications device 103. Responsive to this signal, the processor/controller 113 develops a control signal for controlling frequency tuning and/or impedance controlling elements 117. For example, the processor/controller 113 is responsive to the signal indicating the PA output power or the operating frequency of the communications device 103. Responsive thereto, the processor/controller 113 effects a change to the antenna to change the antenna impedance and/or the antenna resonant frequency. For example, the processor/controller 113 selects a location of a feed point and/or a ground point on the antenna structure to modify the antenna's impedance and/or changes the antenna's effective electrical length by controlling radiating segments to effectively lengthen or shorten the antenna's radiating structure. Responsive to the change in antenna impedance and/or resonant frequency, the PAE improves and/or operation of the communications device improves.

In an embodiment where the frequency tuning and/or impedance controlling elements 117 comprise a plurality of controlled impedance elements (each further comprising one or more inductive and capacitive elements), the processor/controller 113 switches in or connects one or more of the impedance elements to the antenna 105 to change the antenna impedance as presented to the PA, improving the PA PAE at the commanded PA RF power output.

For example, it may be determined according to the teachings of the present invention that insertion of a capacitor of a first value into the antenna circuit improves the PA PAE for operation in the PCS frequency band and insertion of a capacitor of a second value improves the PAE for operation in the DCS frequency band. The appropriate capacitor is inserted into the antenna circuit responsive to a signal indicating the operational band of the communications device 103 that is supplied to the antenna processor/controller 113.

In yet another embodiment, the processor/controller 113 modifies (e.g., by switching antenna elements and related circuits in and/or out of the antenna circuit, moving an antenna ground point relative to its feed point or moving the feed point relative to the ground point) one or more antenna physical characteristics (e.g., effective electrical length, feed point location, ground point location) to modify the antenna resonant frequency (and/or the antenna terminal impedance) and thereby improve performance of the communications device 103 for the current operating frequency band. Thus as can be seen from the examples set forth herein there are multiple techniques and structural elements that can be employed to controllably modify the antenna impedance and/or the antenna resonant frequency to improve operation of the communications device 103.

One technique for controlling the antenna resonant frequency inserts a capacitor in series with the antenna radiating structure, resulting in an appreciable resonant frequency change while only slightly changing the antenna impedance. A capacitor placed in parallel with the antenna radiating structure can also change the resonant frequency, but may cause a greater change in the antenna impedance.

In another embodiment the antenna resonant frequency is modified under control of the processor/controller 113 by inserting (switching in) or deleting (switching out) conductive elements of different lengths from the antenna radiating structure. The control signal thus modifies the antenna effective electrical length. For example, meanderline elements having different effective electrical lengths can be switched in or out of the antenna 105 to alter the resonant frequency. Such components for effecting this resonant frequency tuning are described further below.

Figure 3:
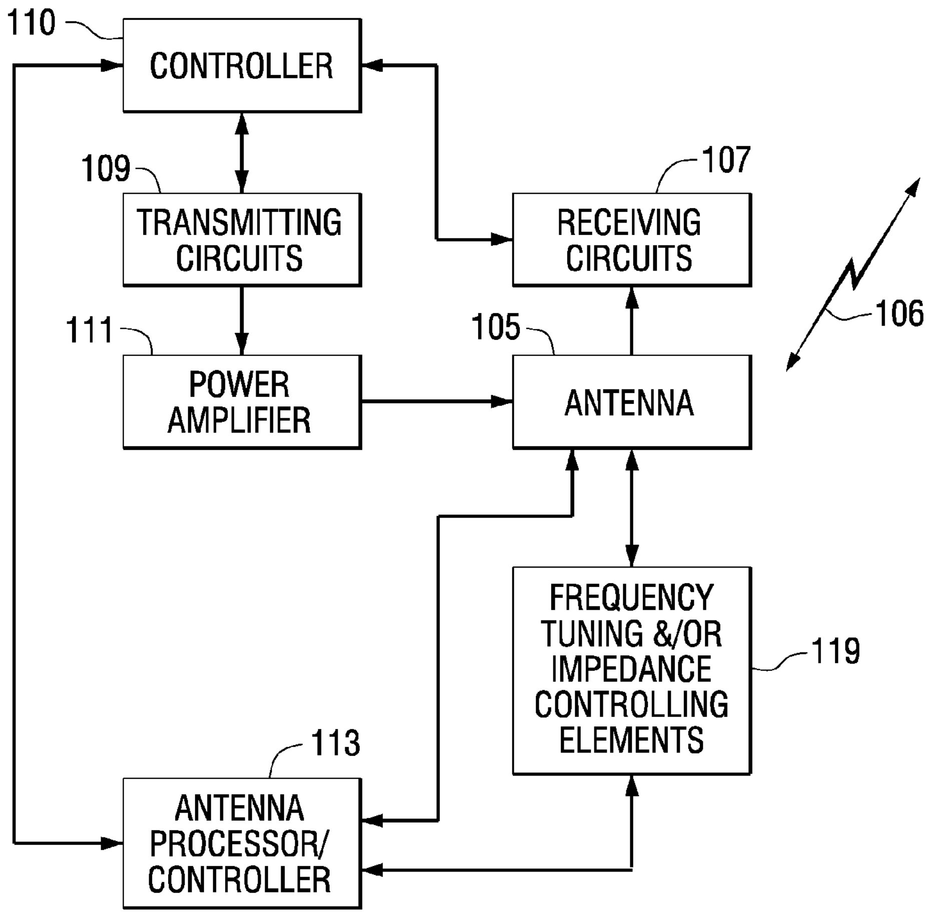

The frequency tuning and/or impedance controlling elements 117 of FIG. 2 can comprise elements associated with the antenna 105 or, as illustrated in FIG. 3, can comprise impedance controlling elements 119 separate from the antenna 105 and interposed between the PA 111 and the antenna 105. References herein to the element 117 includes the element 119.

Various operating parameters of the communications device 103 and its components can be determined and responsive thereto a control signal supplied to the frequency tuning and/or impedance controlling elements 117. Such parameters include, but are not limited to, the PA RF output power, the operating frequency of the communications device and the VSWR on the PA/antenna signal path.

In a cellular system application of the present invention, the power amplifier in the cellular handset is an element of a closed loop control system with a base station transceiver. When turned on, the handset RF power is set to a default value (probably near a maximum output power) and an operating frequency is selected. When the user places a call, a signal is transmitted on a control channel to the base station requesting a frequency or time slot assignment. The base station responds with an assigned frequency and transmit power for the handset. According to the teachings of the present invention, the antenna impedance is adjusted to a desired value responsive to the commanded transmit power and the antenna is tuned to the proper resonant frequency.

During the cellular call the base station transceiver may command the handset to reduce or increase its output power and/or change to transmitting or receiving on a difference frequency, according to an operating scenario of the communication system and the handset. The new commanded power output is employed to again adjust the antenna impedance and/or the antenna resonant frequency. Thus the base station power command controls the PA to change the power level of the transmitted signal and also controls the antenna impedance (the PA load impedance) to present an impedance that improves the PAE.

In one embodiment the impedance is controlled to increase the PA PAE to the maximum PAE of 50%. Unlike the prior art, the PAE is increased without changing the PA DC bias voltage/current, although the techniques described do not prevent the use of bias control or multiple stage switched power amplifiers stages as currently known in the art.

In another embodiment, the VSWR (or the forward power) can be measured and a control signal derived therefrom for controlling the impedance of the antenna to improve the PAE.

When the processor/controller 113 adjusts the antenna resonant frequency as described above, it may then be possible to reduce the PA output power as the signal strength or the signal-to-noise ratio at the receiving device may increase responsive to the resonant frequency change, allowing the power reduction without impairing signal quality at the receiving end. The antenna resonant frequency adjustment may also change the antenna terminal impedance, in turn affecting the power amplifier PAE. To improve the PAE, the resonant frequency adjustment can initiate an antenna terminal impedance adjustment (either directly by modifying antenna structural features or through an intermediate impedance conversion element) to improve the PAE.

According to another embodiment, the antenna parameters are manually adjustable by the user by operation of a discretely adjustable or a continuously adjustable switching element or control component that controls the frequency tuning and impedance controlling elements 117 to change the antenna's resonant length or the antenna impedance to improve the PA PAE and overall efficiency of the communications device. Such an embodiment may also include the processor/controller 113 for automatically adjusting the frequency tuning and impedance controlling elements 117.

Figure 4:
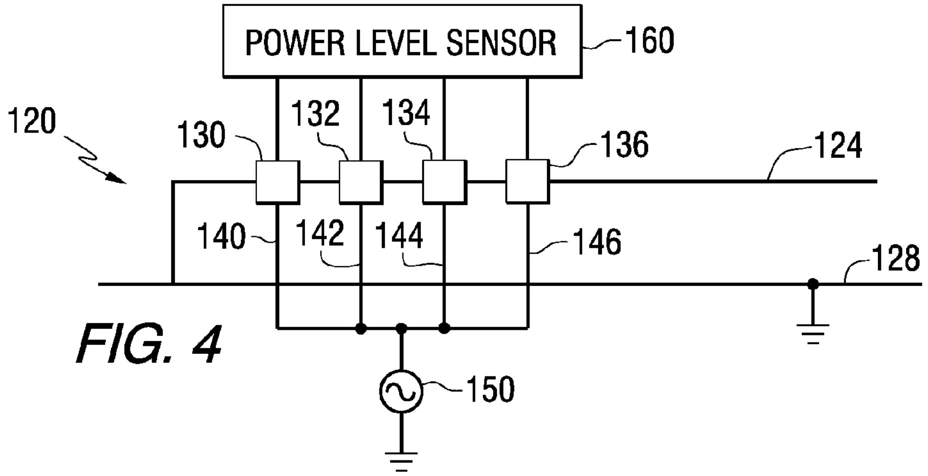
FIGS. 4 and 5 are schematic diagrams of two embodiments of components of a communications device according to the teachings of the present invention.

FIG. 4 illustrates an antenna 120 comprising a conductive element 124 disposed over a ground plane 128. Switching elements 130, 132, 134 and 136 switchably connect feed conductors 140, 142, 144 and 146 to a respective location on the conductive element 124, such that a signal source 150 is connected to the conductive element 124 through the closed switching element 130, 132, 134 or 136. Location of the signal feed relative to the antenna structure affects the antenna impedance. The switching elements 130, 132, 134 and 136 are configured into an opened or a dosed state in response to a control signal supplied by a power level sensor 160. Such power level sensors are conventionally associated with commercially available power amplifiers.

Figure 5:
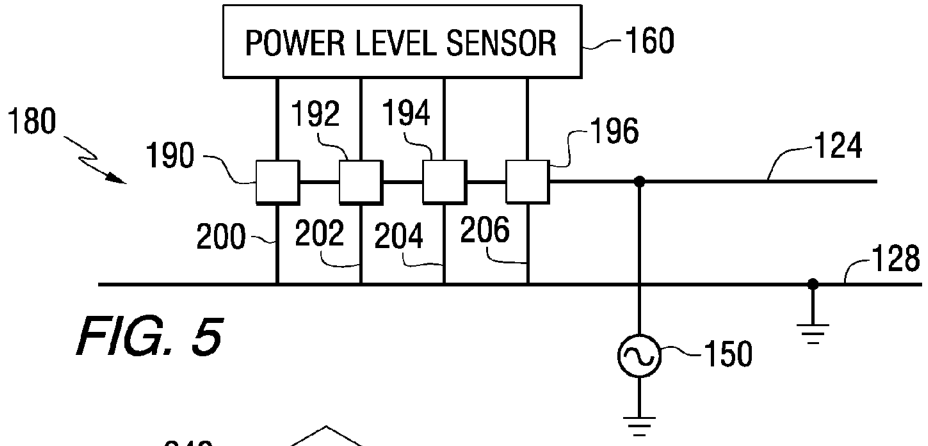

Likewise, the antenna's connection to ground may be repositioned by operation of one or more of a plurality of switching elements that each connect the antenna to ground through a different conductive element. FIG. 5 illustrates an antenna 180 comprising switching elements 190, 192, 194 and 196 for switchably connecting conductive elements 200, 202, 204 and 206 to ground. Appropriate ones of the switching elements 200, 202, 204 and 206 are closed or opened at specific power levels responsive to control signals supplied by the power level sensor 160 to affect the antenna impedance and thus the PAE of the PA operative with the antenna 180.

Although the teachings of the present invention are described in conjunction with a PIFA antenna (planar-inverted F antenna) of FIGS. 4 and 5, the teachings are applicable to other types of antennas, including monopole and dipole antennas, patch antennas, helical antennas and dielectric resonant antennas, as well as combined antennas, such as spiral/patch, meanderline loaded PIFA, ILA and others.

The switching elements identified in FIGS. 4 and 5 can be implemented by discrete switches (e.g., PIN diodes, control field effect transistors, micro-electro-mechanical systems, or other switching technologies known in the art) to move the feed tap (feed terminal) point or the ground tap (ground terminal) point in the antenna structure, changing the impedance appearing between the feed and ground terminals, i.e., the impedance seen by the power amplifier driving the antenna. The switching elements can comprise organic laminate carriers attached to the antenna to form a module comprising the antenna and a substrate on which the antenna and its associated components are mounted. Repositioning of the feed point by appropriate selection of one or more of the switching elements may vary the impedance from about five ohms to several hundred ohms for impedance loading the PA, resulting in more efficient PA operation as described herein.

Certain communications devices provide a variety of communications services and are therefore required to operate in the multiple frequency bands (sub-bands) as employed by those services. Most prior art communications devices comprises a single antenna exhibiting mule-resonant behavior to cover each of the sub-bands.

According to he Chu-Harrington relationship, an antenna's bandwidth decreases as a direct function of decreasing antenna size. This relationship considers physical antenna distances as proportional to an operating wavelength. The Chu-Harrington limit (a widest bandwidth available from an antenna of a specific size) applies to single band antennas. According to this relationship, a relatively large single-band conventional antenna is required to adequately cover the total operating bandwidth of communications devices that operate in multiple frequency bands. But hand-held communications devices require relatively small antennas, which exhibit a narrower bandwidth according to the relationship. It is also noted that few if any communications devices are required to operate simultaneously in more than one sub-band.

When a single antenna presents multiple operating bands, it may be appropriate to evaluate the Chu-Harrington limit on an individual band basis. Since the present invention improves the antenna performance on a per band basis, the Chu-Harrington limit can be reassessed on a per band basis and the results combined to yield results for the total bandwidth covered by the antenna.

According to the teachings of the present invention, the antenna resonant frequency is tuned to the desired operating sub-band using any of the various techniques described herein. Since each of the sub-bands is narrower than the total bandwidth, the tunable antenna of the present invention can be smaller than the single large space-hungry antenna that the Chu-Harrington relationship requires.

Figure 6:
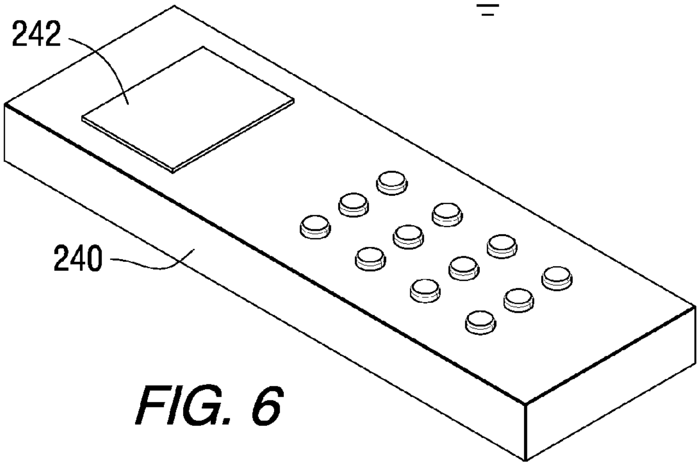
FIG. 6 is a perspective view and FIG. 7 is a cross-sectional view of a handset communications device.

FIG. 6 illustrates a handset or other communications device 240 having an antenna disposed within the device 240 in a region generally identified by a reference character 242. As is known in the art, when the handset 240 is held by the user for receiving or transmitting a signal, the user's hand is placed proximate the region 242. The distance between the user's hand and the antenna is determined by the user's hand size and orientation of the hand relative to the antenna.

The so-called hand-effect or proximity loading refers to the affect of the user's hand on antenna performance. When the user's hand (and head) are proximate the handset and its internal antenna, the collective dielectric constant of the materials comprising the hand and the head changes the antenna operating characteristics from those experienced in a free space environment, i.e. wherein air surrounds the antenna and thus antenna performance is determined by the dielectric constant of air. This effect detunes the antenna resonant frequency, typically lowering the resonant frequency. The antenna may also be detuned by the configuration of certain handset mechanical components, such as a folder position for a folder-type handset and a slider position for a slider-type handset. The teachings of the present invention can also obviate the detuning effects of these physical configurations.

A handset designed for operation in the CDMA band of 824-894 MHz includes an antenna that exhibits a resonant frequency peak near the band center and an antenna bandwidth that encompasses most, if not all, of the CDMA frequency band to achieve acceptable handset performance. But the hand-effect detunes the antenna such that the resonant frequency is moved to a frequency below the band center or perhaps even out of the band. The result is impaired antenna and handset performance since the antenna bandwidth is no longer coincident with the CDMA frequency band of 824-894 MHz. It is known that the hand-effect can detune the antenna by up to 40-50 MHz for handsets operating in the CDMA band.

One known technique for overcoming the hand-effect uses a wide bandwidth antenna, including the frequencies of interest, i.e. 824-894 MHz, and extending to frequencies both above and below the band of interest. When the hand-effect detunes the antenna, the operating frequencies remain within the antenna bandwidth. However, according to the various principles that govern an antenna's physical attributes and performance (e.g., the Chu-Harrington effect), there is a direct relationship between antenna bandwidth and size, i.e., as the antenna bandwidth increases, the antenna size increases. But as handset size continues to shrink, the use of larger antennas to provide wide bandwidth operation is not feasible and is deemed unacceptable by handset designers and users.

Figure 7:
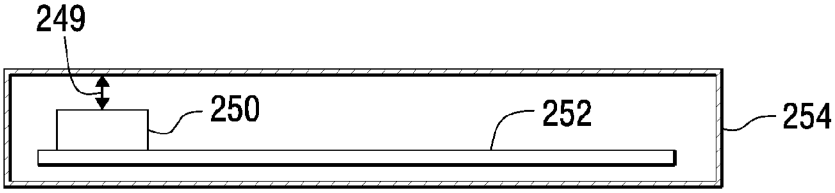

Another known technique for overcoming the hand-effect increases the distance 249 (see FIG. 7) between the antenna 250 (mounted on a printed circuit board 252) and the handset case 254. Increasing this distance by as little as 5 mm appreciably reduces the hand-effect. However, handset size must be increased to accommodate the increased distance.

According to an embodiment of the present invention, a frequency-tunable active internal communications device (handset) antenna overcomes certain of the disadvantages associated with the prior art antennas described above, especially with respect to the hand-effect and proximaity antenna loading of the antenna by the body or other objects. Tuning the antenna reduces these effects (in both the transmit and receive modes) and improves the radiated efficiency of the system, i.e., the antenna, power amplifier and related components of the communications device. The tuning can be accomplished responsive to a signal that indicates that the antenna has been detuned, for example, by the hand effect. For example a control signal that senses power output of the communications device, the transmitting frequency or a signal derived from a near-field probe can be used for tuning the antenna. The tuning can also be effected by a manually controlled switch operated by the user. In certain applications, however, the output power (or VSWR) may be a difficult parameter to use for tag as signal -absorption by the body can mask the signal detuning. That is, the output power of VSWR may actually improve while the antenna frequency is detuned from the desired operating frequency or frequency band.

Figure 8:
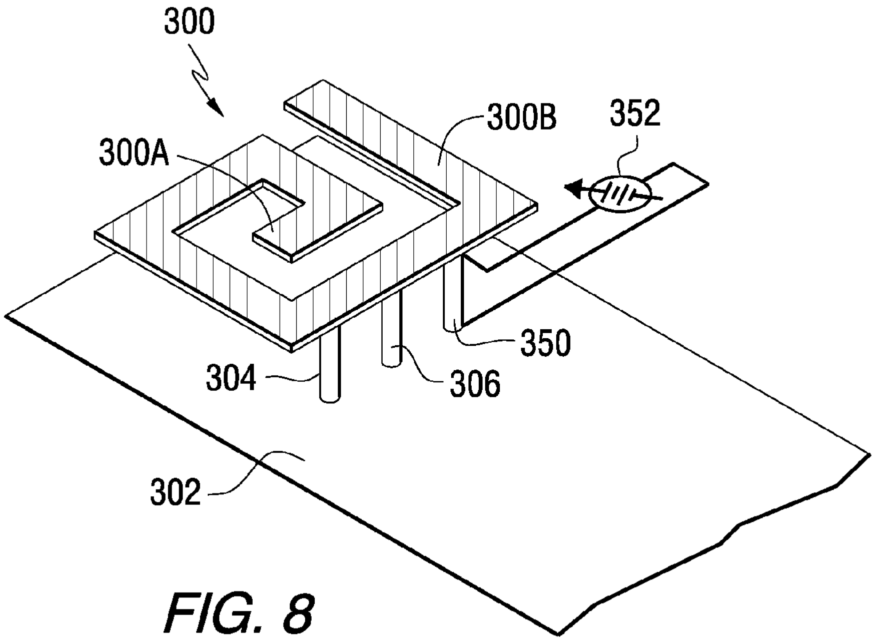
FIG. 8 is a schematic illustration of an antenna according to one embodiment of the present invention.

FIG. 8 illustrates an antenna 300 (in this example the antenna 300 comprises a spiral antenna, but the teachings of the present invention are not limited to spiral antennas) mounted proximate or above a ground plane 302 disposed within a handset communications device. The antenna 300 further comprises an inner spiral segment 300A and an outer spiral segment 300B. A ground terminal 304 of the antenna 300 is connected to the ground plane 302. The handset comprises signal processing components, not shown, operative to process a signal received by the antenna 300 when the handset is operating in the receive mode, and for supplying a signal to the antenna 300 when the handset is operating in the transmit mode. A feed terminal 306 is connected between such additional components and the antenna 300.

Figure 9:
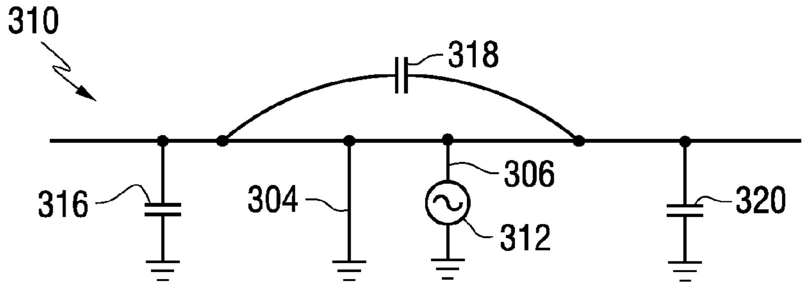
FIG. 9 is a schematic illustration of parasitic capacitances of the antenna of FIG. 7.

An equivalent circuit 310 of the antenna 300 is illustrated in FIG. 9, including a signal source 312 representing the signal to be transmitted by the antenna 300 when the handset is operating in the transmit mode. The equivalent circuit 310 further includes parasitic capacitances 316, 318 and 320 formed from coupling between the inner spiral segment 300A and the ground plane 302, the outer spiral segment 300B and the ground plane 302, and the inner spiral segment 300A with the outer spiral segment 300B, respectively.

According to the teachings of one embodiment of the present invention, one or more of these parasitic capacitances is modified to change the resonant frequency of the antenna 300 and/or the antenna impedance (relative to the teachings of the present invention to modify the antenna impedance to improve the PA PAE). Accordingly, as shown in FIG. 8, the antenna 300 further comprises a varactor diode 350 (or an electrically controllable capacitor, not illustrated, in another embodiment) responsive to a variable voltage source 352 for altering the capacitance of the varactor diode 350 (or the capacitance of the electrically controllable capacitor) and thus the capacitance between the antenna 300 and the ground plane 302. The antenna resonant frequency is accordingly changed by the capacitance change, which is in turn controlled by the voltage supplied by the voltage source 352. In one embodiment a manually operated controller is provided to permit the handset user to manually adjust the voltage applied to the varactor diode (or the control voltage for the electrically controllable capacitor) to tune the antenna 300 for optimum performance. In another embodiment, the antenna processor/controller 113 (see FIG. 2) controls the variable voltage source 352 responsive, for example, to the band, sub-band or frequency at n which the communications device is operating.

Changing the capacitance in any region of the antenna 300 will change the antenna's resonant frequency. Changing the capacitance where the current is maximum or near maximum may cause a change in the resonant frequency. Also, relatively small capacitance values can be used to effect the change in high impedance regions of the antenna, because the reactance of a small capacitor is more significant in relation to the impedance of the antenna at the high impedance regions. One area where an impedance change can be made includes a region proximate the ground and/or the feed terminals 304/306, and thus the varactor diode 350 is preferably disposed proximate the ground/feed terminals 304/306. In addition to the use of a varactor, the capacitance can be changed by other techniques that are considered within the scope of the present invention.

According to another embodiment, an inductance of the antenna 300 is modified to change the antenna's resonant frequency (including the fundamental resonant frequency and other resonant modes). Such an inductance can be in series or in parallel (to ground) with the antenna 300. Thus either an inductive or a capacitive reactive component (or both) of the antenna reactance can be modified to change the resonant frequency.

Figure 10:
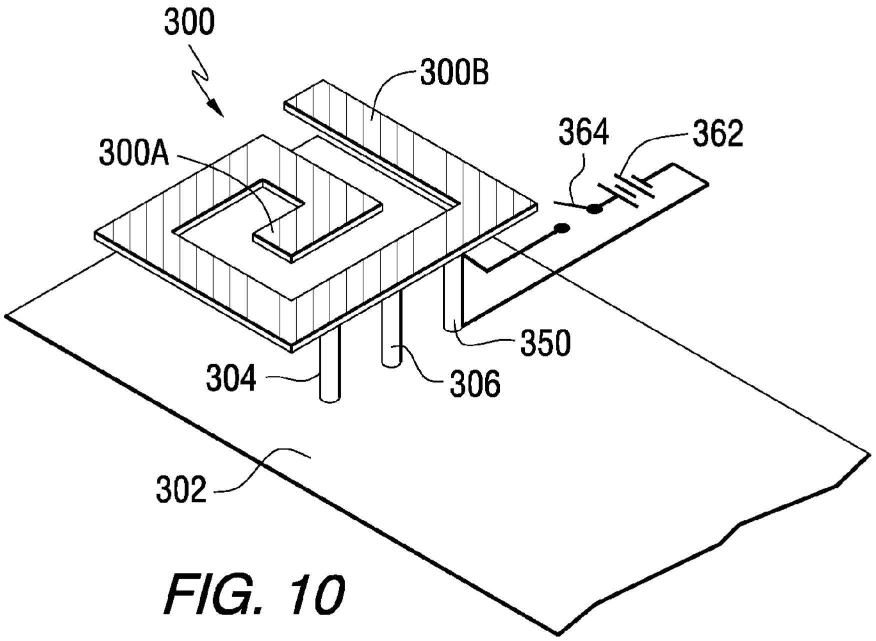
FIG. 10 is a schematic illustration of an antenna according to another embodiment of the present invention.

According to yet another embodiment, the resonant frequency is controlled by application of a discrete fixed DC voltage supplied by a voltage source 362 to the varactor diode 350 (or to an electrically controllable capacitor) via a switching element 364. See FIG. 10. The switch 364 can be manually operated by the user or controlled automatically responsive to a performance parameter or an operating metric that indicates the antenna has been detuned from its resonant frequency.

Thus this embodiment provides a discrete resonant frequency shift in response to the value of the DC voltage when the switching element is placed in a closed or shorted condition. The invention further contemplates multiple voltage sources and corresponding multiple switches to provide multiple capacitance values and thus multiple resonant frequencies from a single antenna. MEMS switched or integrated capacitors (for example, an electrically controllable capacitor) may also be used in this application, as well as any other capacitive tuning methodology.

Figure 11:
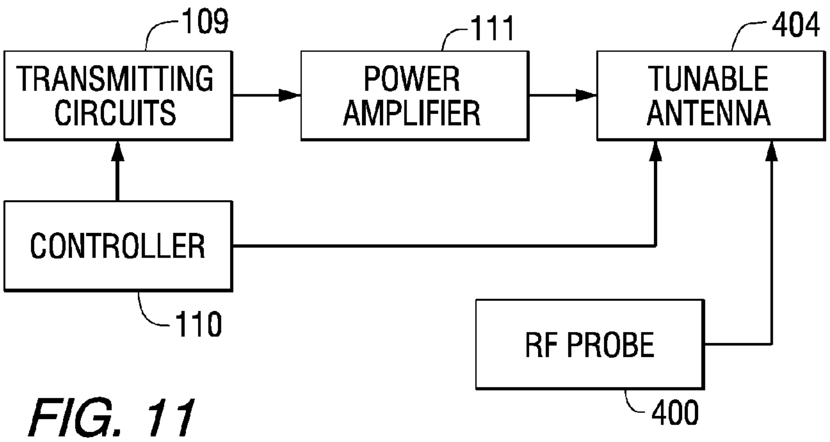
FIG. 11-18 are block diagram illustrations of apparatuses for controlling one or more antennas according to the teachings of the present invention.

In another embodiment, an RF (radio frequency) probe 400 of FIG. 11 senses the radiated power in the near field region of a tunable antenna 404 responsive to the power amplifier 111. An antenna tuning system, such as those described herein (including the antenna processor/controller 113 of FIG. 2), tunes the antenna resonant frequency to maximize the probe response. The tuning may be in discrete predetermined steps or responsive to maximizing the sensed near field power. Generally, this technique does not compensate for absorption losses in material surrounding the antenna, but corrects for lossless dielectric effects on the antenna resonant frequency.

Certain communications devices or handsets are operable according to multiple system protocols (e.g., CDMA, TDMA, EDGE, GSM for a cellular system or Bluetooth or IEEE 802.11x), each protocol assigned to a different frequency band (also referred to as a sub-band). In the prior art, such a handset includes multiple antennas, with each antenna designated for operation in one of the frequency bands or an antenna capable of multiple resonance behavior. The use of multiple antennas obviously increases handset size and a single antenna with multiple resonance behavior is not optimized for any specific frequency, especially if the sub-bands are spaced apart, thereby degrading performance.

The present invention tunes a single antenna responsive to the operating sub-band (by activation of the appropriate switch element to change the antenna resonant frequency) when it is desired to operate the handset in a different frequency band, e.g., in response to a different cellular protocol. For handsets that automatically switch to a different available protocol, a handset controller automatically controls the antenna resonant frequency by selecting the appropriate DC voltage for the varactor diode 350 (or another device that presents a controllable capacitance) such that the antenna resonant frequency is within the selected operating band.

Figure 12:
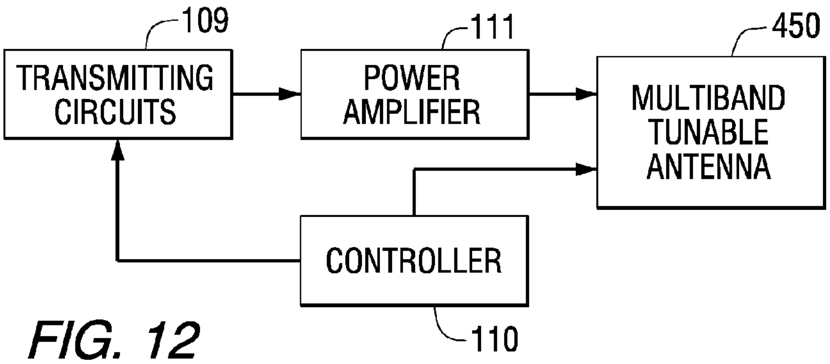

Such a multiband antenna according to the present invention is depicted by a multiband tunable antenna 450 of FIG. 12. Operational parameters the multiband antenna 450 are controlled in response to a signal, supplied from the controller 110, indicating a current operating sub-band of the communications device.

When the communications device switches between operation in a first frequency band to operation in a second frequency band, the impedance presented by the antenna 450 changes and may not be an optimal impedance for the PA 111, i.e., provide a load impedance that permits the PA to operate at a desired PAE. An optimal impedance is less likely if the multiple bands are significantly spaced apart in frequency. Such a scenario may arise in a handset where there is a marked decrease in power amplifier PAE when switching from operation on the GSM band (880-960 MHz) to operation on the CDMA band (82-894MHz). For example, the VSWR can increase and the PAE can decline when operation switches to the second frequency band. Thus according to one embodiment of the present invention, both the resonant frequency and the antenna impedance can be controlled to improve operation of the communications device, including the PAE of the PA. Of particular value is the use of a smaller antenna having adequate performance over a band or subband(s), and control of the resonant frequency and/or the antenna terminal impedance between the receive and transmit modes of operation when operating in a different band or subband(s).

Responsive to a control signal indicating a current operating band or sub-band the antenna is tuned to a different resonant frequency and/or the antenna impedance is modified to present a PA load impedance that raises the PA PAE. The frequency tuning and/or impedance adjustment can be accomplished by a stub tuner or combinations of lumped and distributed elements, modifying the antenna impedance to improve the PA PAE for a requested PA output power level or retuning the antenna back to its desired resonant frequency.

Alternatively, the antenna resonant frequency and/or impedance can be changed by modifying one or more of the antenna's effective electrical length, inductance or capacitance, including modification of these features by using one or more lumped capacitance or inductance elements, or using the various techniques described herein. In one application, antenna band tuning as implemented by the elements of FIG. 12 increased the PA PAE by about 9%; PAE increases up to about 20% have also been observed.

Providing an antenna frequency tuning capability permits reduction of the antenna volumetric size (the reduction estimated to be about ½) due to the reduced bandwidth requirement, as the antenna is required to resonate in only one band or sub-band at any time. Simulations indicate that in certain applications antenna resonant frequency tuning alone may produce the desired PAE gain, without the need to control the antenna impedance, i.e., the PA load impedance, while maintaining sufficient bandwidth to cover each band or sub-band, thereby taking advantage of the potential for reduced antenna volume.

Figure 13:
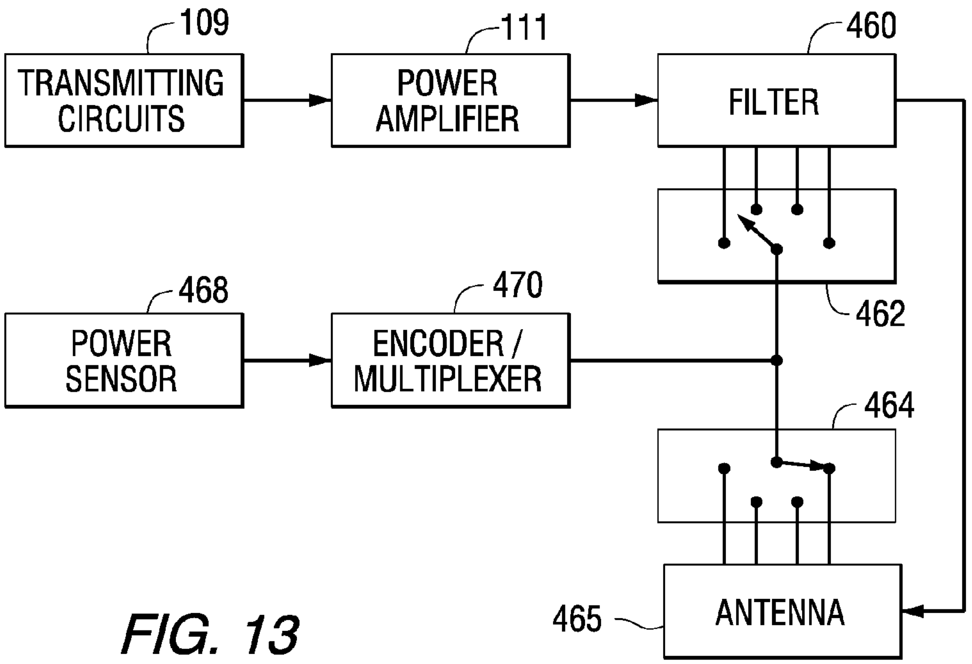

FIG. 13 illustrates another embodiment of the present invention wherein an impedance of one or both of a filter 460 and an antenna 465 are controllable to improve the PAE of the power amplifier 111 as the power amplifier output power changes as described above. A switch assembly 462 selects elements of the alter 460 to effect a filter input impedance change. Similarly, a switch assembly 464 selects elements of the antenna 465 to effect an antenna impedance change.

Generally, the filter is controlled in accordance with its filtering functions, e.g., filtering out-of-band harmonic frequencies within a frequency band with minimal insertion loss. Controlling the filter also assists in presenting a desired PA load impedance (in conjunction with the antenna impedance) to achieve the desired PA PAE.

Any of several different signals produced by the communications device can be used to control the switch assemblies 462 and 464. In the illustrated embodiment a control signal derived from a power sensor 468 is supplied to an encoder/multiplexer 470 for producing a control signal for each switch assembly 462 and 464. Responsive to the control signal, the switches 462 and 464 (illustrated as mechanical switches but implantable as electronic, mechanical or electromechanical switches) are configured to present the desired impedance for their respective controlled devices. Techniques and components for controlling the antenna impedance as described elsewhere herein can be applied to the FIG. 13 embodiment to control the filter input and/or output impedances and the antenna impedance.

Figure 14:
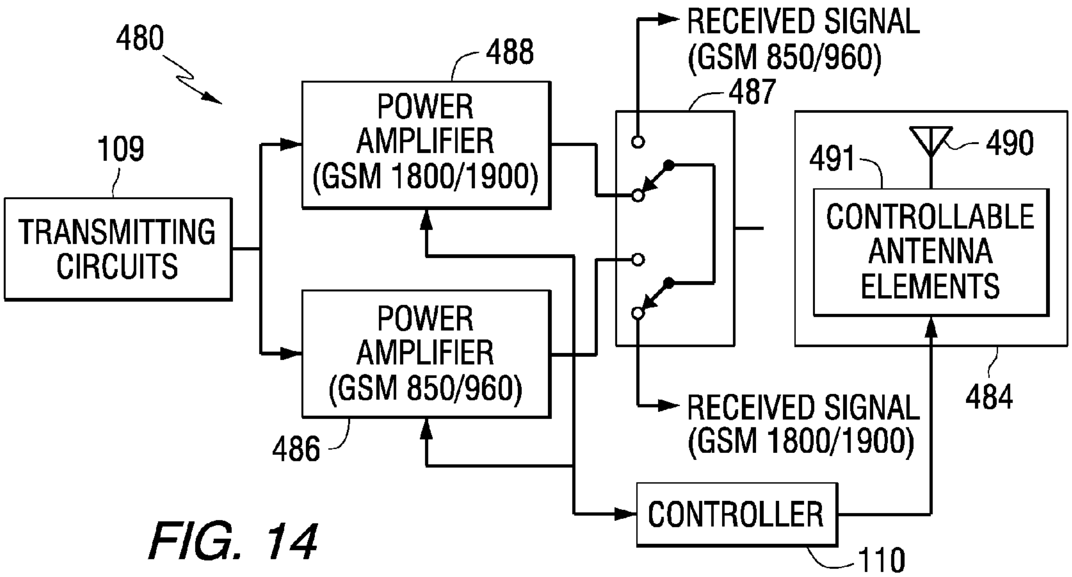

FIG. 14 illustrates certain elements of a dual-band communications device 480 capable of operating in both the GSM band of 850/960 MHz and in the GSM band of 1800/1900 MHz. When operating in the former GSM band, the signal to be transmitted is supplied to an antenna 484 though a power amplifier 486 and a properly configured transmit/receive control switch 487. When operating in the latter GSM band, the signal to be transmitted is supplied to the antenna 484 through a power amplifier 488 and a different configuration of the transmit/receive control switch 487. The antenna 484 comprises a radiating structure 490 and controllable antenna elements 491 that permit adjustment of the antenna's resonant frequency and/or its impedance.

A control signal supplied by the controller 110 controls the power amplifiers 486/488 and the controllable antenna elements 485 responsive to the desired operating band or sub-band and the PA output power. The control signal controls the elements 485 to present an antenna impedance that provides a desired PAE for the PA's 486/488. Additionally, the control signal controls the elements 491 to present an antenna resonant frequency within the operating frequency band or sub-band.

Although described in conjunction with a communications device operating in one of the GSM bands, the teachings of the present invention as described in conjunction with the communications device 480 also applicable to other signal transmission protocols, i.e., EGSM, CDMA, DCS, PCS, EDGE etc. and other non-cellular communications systems and protocols.

Providing the capability to tune the antenna in a communications device also permits use of smaller antenna structures while the antenna structures (and their associated components, such as the PA) operate at a higher PAE than prior art antennas. Although not apparent, his is a direct result of the Chu-Harrington relationship between bandwidth and antenna volume. Generally, a smaller antenna exhibits a narrower bandwidth, but if the antenna resonant frequency is controllable to a current operating band of the communications device, then a wide band antenna capable of acceptable operation in all frequency bands in which the communications device operates is not required. A smaller (and therefore likely more efficient) antenna can be employed in the communications device if the antenna's operating band or sub-band is selectable responsive to the operating band or sub-band. For example, in a half duplex communications system (different transmit and receive frequencies), a position of the transmit/receive control switch commands the antenna to change its resonant frequency to the operative sub-band depending on whether the wireless device is in the transmit or receive state. This technique allows most antennas to be reduced in volume by about a factor of ½ and commensurately increases the antenna's PAE.

According to another embodiment, for half-duplex communication protocols a communications device processor selects either the receive or the transmit portion of the band (sub-band) depending on the handset operational mode and supplies a control signal to the antenna to alter one or more antenna parameters, by techniques described herein, to modify the antenna resonant frequency and/or the antenna impedance. Since the sub-bands have a narrower bandwidth than the full band over which the communications device operates, antenna size can be reduced according to this embodiment.

What is not obvious to those trained in the art is that the embodiments of the present invention permit use of a smaller antenna within the communications device, while improving antenna performance (e.g., PAE) over the operating bandwidth. The ability to alter or select antenna performance parameters (e.g., resonant frequency) in response to an operating frequency of the communications device obviates the requirement for an antenna that is capable of operating in all possible bands, and further permits use of a smaller adaptive antenna without sacrificing antenna performance. In fact, antenna performance may be improved. At a minimum, constructing a smaller antenna and using the teachings of the present invention to improve its performance, overcomes the known performance limitations of the smaller antenna. Thus smaller handsets can be designed for use with smaller antennas, without sacrificing antenna and handset performance. To improve antenna performance, the processor can improve the feed point, ground point, impedance, antenna configuration or antenna effective length for a given operating condition (e.g., signal polarization or signal protocol) or operating frequency.

Advantages obtained according to the present invention are: 1) smaller antenna size; and 2) improved antenna PAE over the operating bandwidth due to adaptive control of the antenna configuration based on the current operating bandwidth.

Antenna tuning can also overcome the detuning due to hand or other proximity effects. It is well known that antenna frequency can shift when the user brings body parts or other objects in proximity to the handset or wireless communications device. Two physical phenomena occur in that case, both resulting in poorer handset signal reception and transmission. The first effect is detuning of the antenna resonance caused by proximal capacitive loading of the antenna. The second is absorption of signals caused by resistive loss mechanisms (including complex-valued dielectric constants) associated with dielectric properties of the proximate biological or other substances (wood, paper, water, etc.).

Operating wireless handheld devices in proximity to the human body often results in over 7 dB of loss in the far field radiated signal. At least 3 dB of loss is attributable to absorption, as verified by published simulation studies. A portion of the remaining loss may be therefore be attributable to antenna detuning effects (4 db or more).

The present invention actively tunes the antenna, but may not correct for the aforementioned loss due to absorption of the radiated field components. Nevertheless, this approach improves the handset receive or transmit performance by several decibels. Current reduction of radiated signal performance due to hand/head loading is typically from −3 dBi to over −10 dBi. Estimates are that 4 dB or more added gain may result from the near field controlled tuning technique of the present invention.

Figure 15:
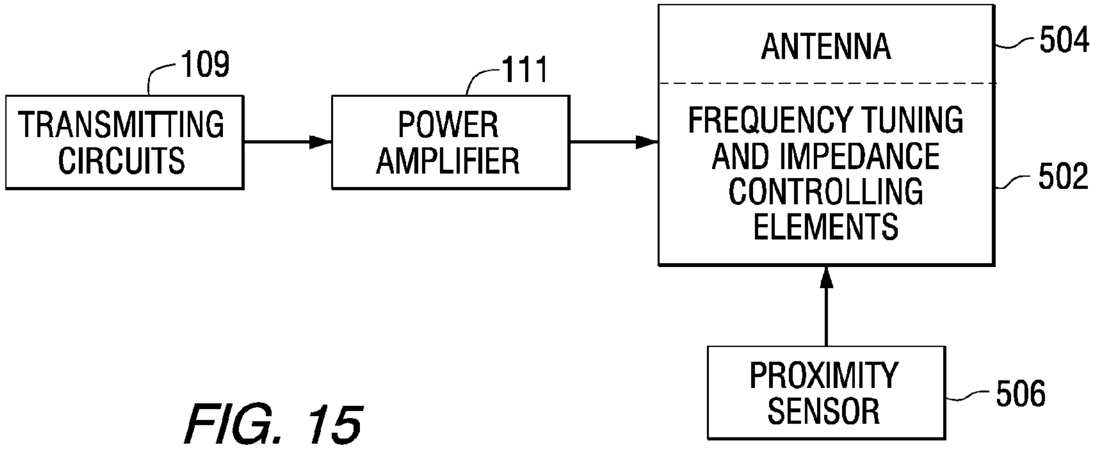

This embodiment can be implemented by altering the inductive or capacitive tuning elements in the antenna, such as by controlling frequency tuning and impedance controlling elements 502 of an antenna 504 responsive to a proximity sensor 506, as illustrated in FIG. 15. The embodiment can also be implemented by changing the effective electrical length of the antenna as described above.

Figure 16:
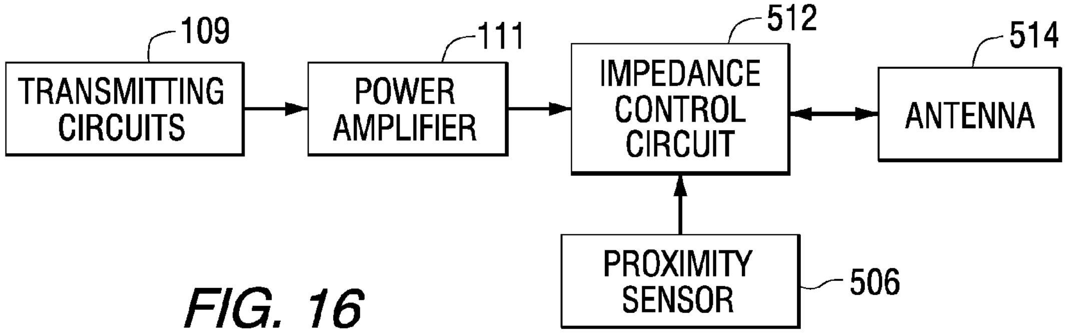

In another embodiment, the proximity sensor 506 supplies a control signal to an antenna impedance control circuit 512 (see FIG. 16) for controlling the impedance seen by the power amplifier 111 into an antenna 514 or for controlling the resonant frequency of the antenna 514.

The proximity sensor 506 comprises a sensor that detects the presence of the body or a body part using an optical sensor, a capacitive sensor or another sensing device. In response to that control signal, the antenna is tuned to a predetermined frequency to offset the detuning caused by the proximate object and partially compensating the loss due to the detuning. In another embodiment, the proximate sensor is replaced with a near-field RF probe for supplying a control signal that tunes the antenna to maximize the near field signal.

In another embodiment, the sensor 506 comprises a component for detecting a configuration of a handset communications device. For example, a slider type handset and a flip type handset can be in an open or closed position, influencing operation of the antenna 504. By determining the handset configuration, the antenna can be controlled to improve antenna and handset performance.

In yet another embodiment, the present invention comprises an antenna resonant frequency tuning component for use during manufacture of the communications device to reduce resonant frequency variations in the manufacturing processes.

Such a resonant frequency tuning component comprises a plurality of tuning components (a matrix of components, for example) such as the frequency tuning and impedance controlling elements 117 (see FIG. 2) or the tunable antenna 404 (see FIG. 11) as described above, that are controllable to compensate the expected range of resonant frequency and bandwidth variability resulting from production variations. During the production stage, the tuning components are configured to set the desired resonant frequencies for optimum performance MAE, VSWR, etc). In one embodiment, a tuning matrix comprises a passive assembly with fusible links that are opened (blown) to insert matrix components into the antenna circuit. In another embodiment active device switches (control field effect transistors, micro-electro-mechanical systems (MEMS) or other switch technologies known in the art) are utilized to insert components into the antenna circuit by closing one or more of the switching devices.

Figure 17:
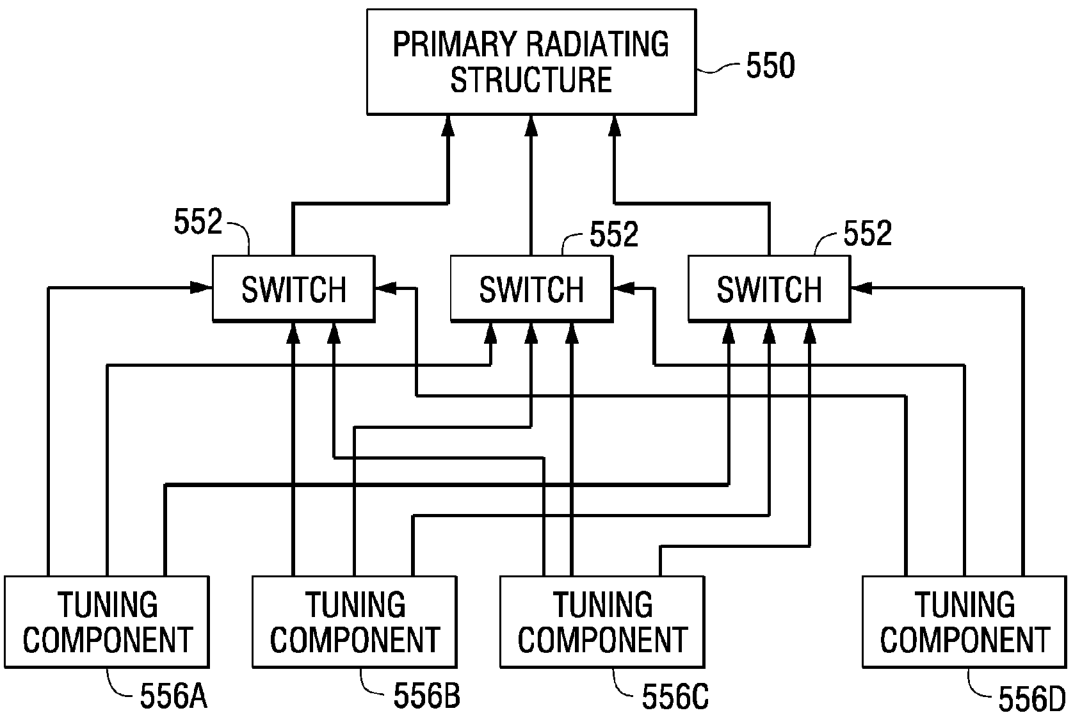

FIG. 17 illustrates a primary radiating structure 550 of an antenna. Switches 552 (e.g., fusible links, transistor switches) switchably connect one or more of the tuning components 556A, 556B, 556C and 556D to various locations on the primary radiating structure 550 to control one or more of the antenna impedance and the resonant frequency. The switches can be permanently opened or closed after manufacturing and testing the primary radiating structure 550 to overcome the effects of manufacturing variations. In another embodiment, the switches 552 are controlled by a controller associated with a communications apparatus with which the primary radiating structure 550 operates, the controller responsive to operating characteristics of the communications apparatus to control the switches 552 and thereby control operation of the antenna, in particular, the antenna resonant frequency and impedance.

The teachings of the present invention can also be applied to a communications device providing antenna diversity. That is, each of the diverse antennas includes components to effectuate a change in reactance or a change in effective electrical length to control the antenna resonant frequency.

Figure 18:
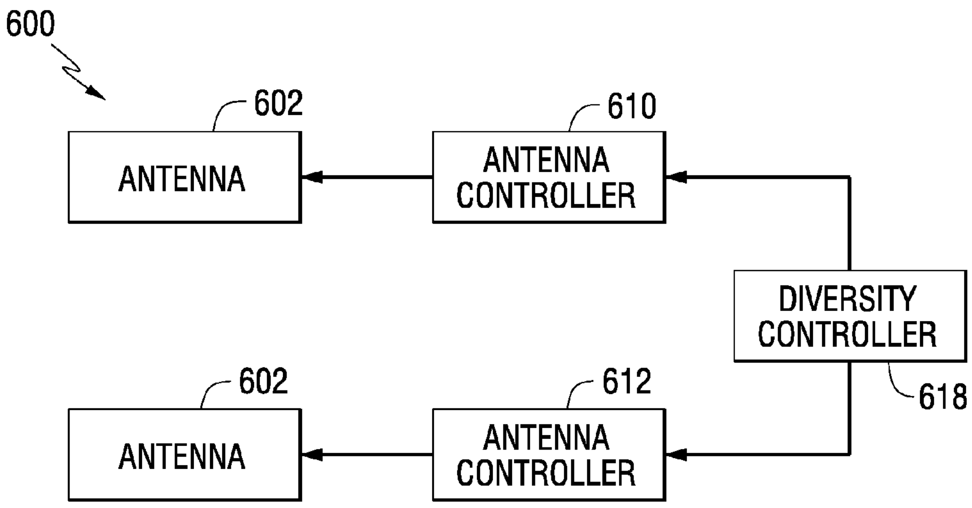

As illustrated in FIG. 18, a communications device 600 includes two antennas 602 and 604, each responsive to an antenna controller 610 and 612 for controlling the respective antenna resonant frequency and/or impedance according to the various teachings and embodiments of the present invention. A diversity controller 618 determines which one of the antennas 610 and 612 is operative at any given time (in the receive mode, the signals can be combined to produce a composite received signal). A processor executing an appropriate algorithm controls the antenna controllers 210 and 212 and the diversity controller 218 to improve a signal quality metric of the communications device.

Figure 19:
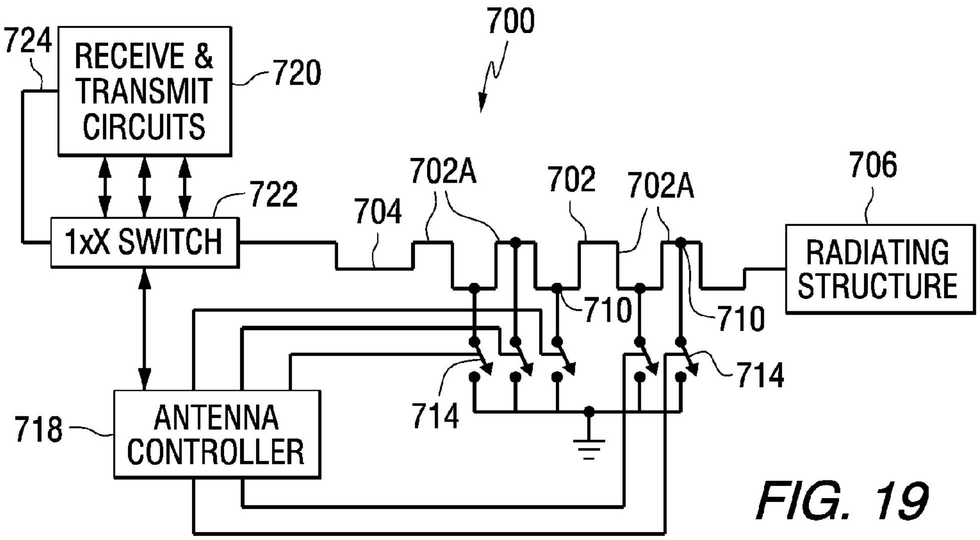
FIGS. 19-21 are block diagram illustrations of various antenna control techniques according to the teachings of the present invention.
Figure 20:
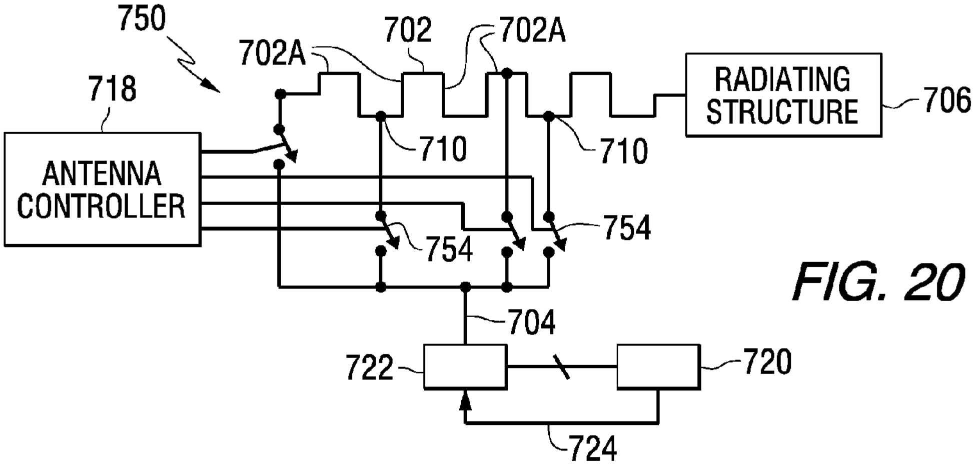
Figure 21:
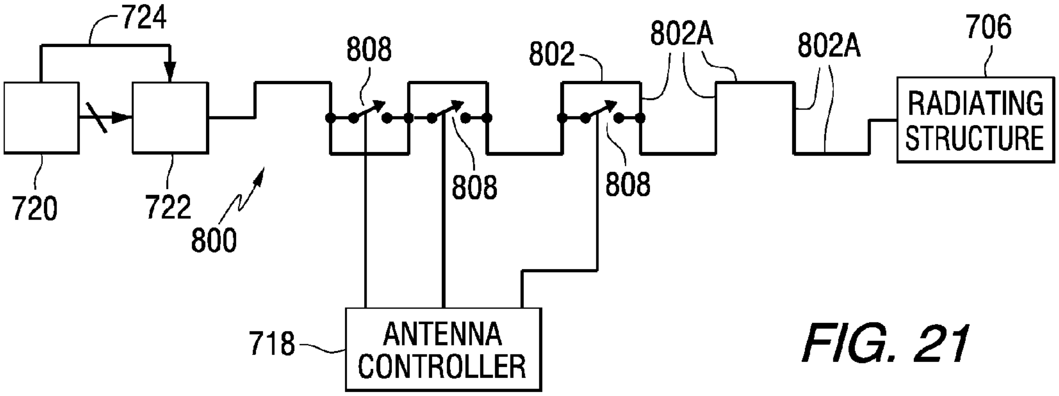

FIGS. 19-21 illustrate additional configurable or controllable antennas that offer the capability to overcome or at least reduce the effects of undesirable conditions within the antenna's operating environment. An antenna 700 in FIG. 19 comprises a meanderline structure 702 further comprising a plurality of meanderline segments 702A, a first terminal end connected to a feed 704 and a second terminal end connected to a radiating structure 706. Exemplary taps 710 connected to one or more of the meanderline segments 702A are connected to ground by closing an associated switch 714 under control of an antenna controller 718. Connecting one or more of the meanderline segments 702A to ground influences one or more of the antenna resonant frequency, bandwidth and input impedance.

The meanderline structure 702 is a slow wave structure where the physical dimensions of the conductor comprising the meanderline structure 702 are not equal to its effective electrical dimensions. Generally, a slow-wave conductor or structure is defined as one in which the phase velocity of the traveling wave is less tan the free space velocity of light. The phase velocity is the product of the wavelength and the frequency and takes into account the material permittivity and permeability of the material on which the meanderline structure is formed, i.e., $c/((\mathrm{sqrt}(\in_r)\mathrm{sqrt}(\mu_r))=\lambda f$. Since the frequency remains unchanged during propagation through the slow wave meanderline structure 702, if the wave travels slower (i.e., the phase velocity is lower) than the speed of light in a vacuum (c), the wavelength of the wave in the structure is lower than the free space wavelength. The slow-wave structure de-couples the conventional relationships among physical length, resonant frequency and wavelength, permitting use of a physically shorter conductor since the wavelength of the wave traveling in the conductor is reduced from its free space wavelength.

The feed 704 is connected to receive and transmit circuits 720 via a 1xX RF switch 722 of the communications device operative with the antenna 700. The receive and transmit circuits 700, known in the art, comprise one or more low noise amplifiers and associated receiving, demodulating and decoding components for determining the information signal from a signal received by the antenna 700, and further comprise one or more power amplifiers, modulating and coding components producing a transmitted signal responsive to an information signal.

Certain components of the receive and transmit circuits 720 are frequency sensitive and thus for optimum performance of the communications device the appropriate frequency sensitive components must be selected responsive to the operating band and mode of the communications device. The 1xX switch 722, controlled by a control signal provided by the circuits 720 over a control conductor 724 or by a control signal from the antenna controller 718, provides the capability to connect the antenna 700 to the appropriate frequency-sensitive components of the receive and transmit circuits 700. Additionally, it is desired to configure the antenna controller 718 to improve performance of the antenna 700 responsive to the operational mode of the communications device. For example, when the communications device is operative in a receive mode in a first frequency band, the 1xX switch 722 is configured to connect receiving components optimized for operation in the first frequency band to the antenna 700. Further, the antenna controller 718 is configured to control the switches 714 to improve operation of the antenna 700 for receiving signals in the first frequency band.

In an exemplary embodiment, optimization of antenna performance suggests that the switches 714 are configured to present an antenna impedance that improves PAE of the operative receiving circuits 720.

In one embodiment the antenna 700 of FIG. 19 is formed on or within a dielectric substrate. Thus the permittivity and the permeability of the dielectric material comprising the substrate affect the properties of the meanderline structure 702, and thus the properties of the antenna 700. In such an embodiment the antenna 700 can be formed as a module for simplified insertion and connection to the associated circuits of a communications device, such as the handset or communications device 240 of FIG. 6. Use of the module antenna also promotes repeatability during the manufacturing process to ensure proper physical placement and connection of the antenna.

In one embodiment, the switches 714 are implemented by connecting one or more of the taps 710 to ground trough an inductor (not shown) to establish a DC ground for each tap 710.

In a FIG. 20 embodiment, an antenna 750 comprises a configurable signal feed structure comprising the meanderline structure 702. Antenna operating characteristics (e.g., antenna impedance, gain, radiation pattern) are determined by closing one of a plurality of switches 754 under control of the antenna controller 718.

FIG. 21 illustrates an antenna 800 comprising a meanderline structure 802 further comprising a plurality of meanderline segments 802A and exemplary switches 808 controlled by the antenna controller 718 to provide discrete resonant frequency tuning of the antenna 800. Since the meanderline structure 802 forms a portion of the antenna and therefore influences the antenna parameters, including the resonant frequency, shorting one or more of the meanderline segments 802A changes the resonant length and thus the resonant frequency of the antenna 800. One or more of the switches 808 can be closed to tune the antenna 800 to a desired frequency. Generally, tuning by operation of the switches 808 results in discrete, rather than continuous, tuning of the resonant frequency.

In an exemplary operational mode, the 1xX switch 722 is controlled to connect the appropriate frequency-sensitive components of the receive and transmit circuits 720 to the antenna 800, responsive to the current operational parameters of the communications device. The resonant frequency of the antenna 800 is also controlled by configuring the switches 808, under control of the antenna controller 718, to establish an antenna resonant frequency that is the same as the operating frequency of the selected frequency-sensitive components.

The various switching elements identified in FIGS. 19-21 can be implemented by discrete switches (e.g., PIN diodes, control field effect transistors, micro-electro-mechanical systems, or other switching technologies known in the art). The switching elements can comprise organic laminate carriers attached to the antenna to form a module comprising the antenna (e.g., the meanderline structures and the radiating structures), the controlling switches and the 1xX switch on a single dielectric substrate.

Figure 22:
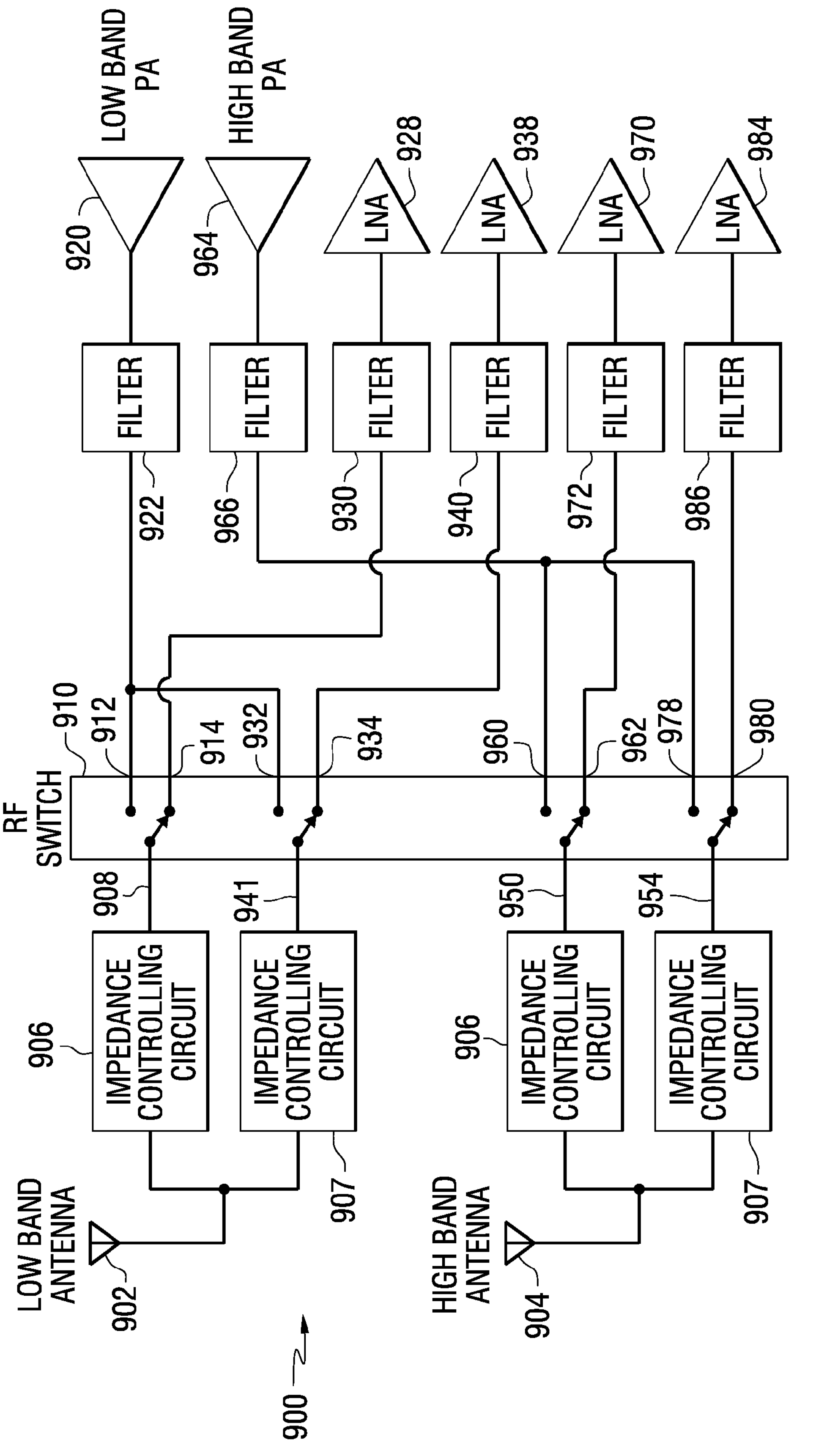
FIG. 22 is a block diagram illustration of a communications device comprising a controllable high band and low band antenna.

FIG. 22 illustrates a band switched antenna structure 900 comprising respective low band and high band antennas 902 and 904. Impedance controlling circuits 906 and 907 connect the low band antenna 902 to a switching terminal 908 of a radio frequency (RF) switch 910. Respective transmit and receive terminals 912 and 914 of the RF switch 910 are connected respectively to a serial connection of a low band power amplifier 920 and a filter 922, and to a serial connection of a first band low noise amplifier (LNA) 928 and a filter 930.

Respective transmit and receive terminals 932 and 934 of the RF switch 910 are connected respectively to the serially connected low band power amplifier 920 and filter 922 and to the serially connected second band LNA 938 and filter 940. A switching terminal 941 is operable to select either the input terminal 932 or the input terminal 934.

Generally, the impedance controlling circuits 906 and 907 are dissimilar to a present a selectable antenna (load) impedance to the low band power amplifier 920 that improves its operation. Typically, the power amplifier 920 operates in two frequency bands, each presenting a different PA output impedance. It is therefore desired to provide a selectable impedance (the impedance controlling circuits 906 or 907).

In one embodiment, the impedance controlling circuit 906 comprises a series connection of a first and a second capacitor at a common terminal, with an inductor connected between the common terminal and ground. In one embodiment, the impedance controlling circuit 907 comprises a series connection of a first and a second inductor at a common terminal, with a capacitor connected between the common terminal and ground. In other embodiments different impedance controlling circuits can be used depending on the impedance of the low band antenna 902 and the impedance of the PA 920.

The high band antenna 904 is connected to a switching terminal 950 through the impedance controlling circuit 906 and to a switching terminal 954 through the impedance controlling circuit 907. Respective transmit and receive terminals 960 and 962 of the RF switch 910 are connected respectively to a serially connected high band power amplifier 964 and filter 966 and to a serially connected third band LNA 970 and filter 972.

Respective transmit and receive terminals 978 and 980 of the RF switch 910 are connected respectively to the serially connected high band power amplifier 964 and filter 966, and to a serially connected fourth band LNA 984 and filter 986.

The filters 930, 940, 972 and 986 associated with the LNA'S function in the conventional manner to remove noise and out-of-band frequency components from the received signal, with the pass band of each filter 930, 940, 972 and 986 dependent on the operational band of its associated LNA.

The operational mode of the switched antenna 900 is determined by operation of the communications device with which the antenna 900 functions. When operating in the low band (i.e., low frequency operation) receive mode, either the switching terminal 908 is configured to connect the low band antenna 902 and the impedance controlling circuit 906 to the filter 930 and the first band LNA 928, or the switching terminal 941 is configured to connect the low band antenna 902 and the impedance controlling circuit 907 to the falter 940 and the second band LNA 938. A configuration of the switching terminals 908 and 941 is controlled by an antenna controller (not shown in FIG. 22) based on the operating characteristics of the communications device. In particular, if the communications device can operate in two different low band frequencies, one of the switching terminals 908 or 941 is operative to connect the associated LNA 928 or 938, respectively, to the low band antenna 902 responsive to the operating low-band frequency.

During operation in the low frequency band transmit mode, the PA 920 is connected to the low band antenna 902 through one of the impedance controlling circuits 906 and 907 via the selected configuration of the RF switch 910, that is via either the terminal 912 or the terminal 932, as determined by one of the impedance controlling circuits 906 or 907 that improves the PAE of the power amplifier 920. In another embodiment, the impedance controlling circuits 906 and 907 are also controllable to change the impedance seen by the associated power amplifier to improve the PAE of that power amplifier.

During operation of the switched antenna 900 in the high frequency band, the switching terminals 950 and 954 are controlled to connect either the LNA 970 or the LNA 984 to the high band antenna 904 in the receive mode or to connect the high band PA 964 to the high band antenna 904 through one of the impedance controlling circuits 906 and 907.

As discussed elsewhere herein, according to the prior art it is usually the intent of the communications device designer to transform the impedances of the components in the transmit and receive signal paths to a nominal 50 ohms to improve device performance. Since these components are typically individually procured and assembled, the presented impedance values may differ substantially from 50 ohms and the transformation to 50 ohms may result in undesired bandwidth limitations as also discussed above.

Additionally, the layout of the components and connecting conductors (which may present other than a 50 ohm impedance) tends to cause the impedance to vary from the desired 50 ohms. Since the load is usually a complex impedance, reactive components or transmission line lengths will change the load at the power amplifier depending on the line length, layout, component selection, filter type, etc. Finally the antenna supplier has no control and little influence over design features and components in the transmit and receive signal paths that can substantially influence antenna performance.

In addition to performance degradation due to these impedance mismatches, it is also known that interaction of the antenna's near electric and magnetic fields with components in the communications device can result in: a) lower radiation PAE due to excitation of unwanted currents in proximate elements that impose electrically resistive loss mechanisms and b) dielectric loading effects on antenna elements that influence its resonant frequency.

To overcome these effects on antenna performance, the present invention teaches a radio frequency module embedding one or more components of toe serial component string including one or more of transmitting and receiving circuits, a low noise amplifier, a power amplifier, filters and connecting elements connecting these components to the antenna. The impedance presented by the module components is substantially consistent among all the module components (and likely not the conventional 50 ohms) to improve signal receiving and transmission performance, overcoming the effects of impedance variations and mismatches of the prior art. An exemplary module is illustrated in FIG. 23 and described in the accompanying text.

The module also improves power amplifier PAE (resulting in longer talk time between battery charges). Use of the module reduces development time to market and lowers manufacturing and component integration costs since all components are embedded in the module and its fabrication is repeatable.

Figure 23:
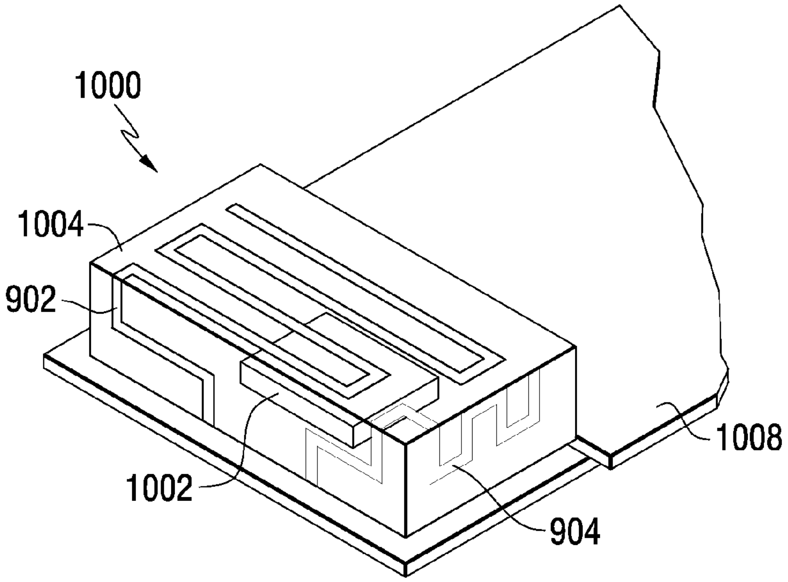
FIG. 23 is a perspective view of a front end module constructed according to the teachings of the present invention.

A modular embodiment of the switched antenna 900 of FIG. 22 is illustrated in FIG. 23, wherein a module 1000 comprises a front end electronics module 1002 (comprising in one embodiment the impedance controlling circuits 906 and 907, the RF switch 910, the filters 922, 966, 930, 940, 972 and 986, the power amplifiers 920 and 964 and the low noise amplifiers 928, 938, 970 and 984 or any combination of these elements), an organic (or other) laminate material 1004, the low band and high band antennas 902 and 904 (preferably constructed from an appropriate length of conductive material, including a conductive flex film material and either printed on or subtractively removed from one or more surfaces of the laminate 1004) and a carrier 1008. In another embodiment the passive components of the impedance controlling circuits 906 and 907 and the passive components of the filters 922, 966, 930, 940, 972 and 984 are formed as passive elements within the material of the laminate 1004. Candidate laminate material include known PCB compounds and epoxy materials both with and without the fiber glass filler material. Printed circuit board material and flex film material can be used in lieu of the organic laminate material.

In an embodiment in which the low and high hand antennas operate in respective frequency bands of 824-960 MHz and 1710-1990 MHz, the modular switched antenna 900 (i.e., the laminate material) is about 28 mm long, about 15 mm wide and about 7 mm high, presenting an antenna volume about one-half to one-quarter the volume of prior art multiband antennas. Embodying the various antenna control techniques taught herein in modular form provides more efficient packaging, simpler insertion into a communications device, lower cost, better reliability and better performance. In particular, the design and layout processes associated with use of the module in the communications device are substantially reduced. Further the selectable/controllable/tunable features of the various antenna embodiments described herein provide a higher PA PAE over the operating bandwidth than the prior art multiband antennas.

Advantageously, within the module 1000 it is not necessary to transform the impedance values of connected components to the conventional 50 ohms. Instead, the transmission line lengths and the impedance presented by the transmission lines are selected to provide the desired impedance transformations between two components connected by the transmission lines.

In CDMA systems, active tuning of the antenna as described herein presents an impedance to the PA via the duplexer intermediate the antenna and the PA. The various schemes according to which the phase, amplitude and/or impedance of the antenna are adjusted to improve the PAE can take into account the transmission characteristics of the duplexer and associated interconnect transmission lines to the antenna and the PA. The frequency-dependent characteristics of the duplexer can therefore be considered when adjusting the antenna impedance. Alternatively, frequency variant tuning of the duplexer can be employed, in addition to tuned elements at the antenna. To improve the amplifier PAE at less than rated load, power dependent tuning of the duplexer itself can be used as well.

As a result it is preferred to include the antenna, phase/amplitude/impedance tuning components, duplexer, and associated control components as part of a module, such as the module 1000 of FIG. 23. The module functions, as described, to present a load to the PA at operating frequencies that optimizes the PA efficiency. In another embodiment some degree of mistuning may be employed to adjust for antenna proximity effects (e.g., proximate relation of the users had and body to the antenna) during operation.

Inclusion of tuning components at the antenna (as described in various embodiments described above) is also an acceptable solution for many problems currently encountered in portable device RF design for CDMA systems. The functions described above, such as optimizing the PA efficiency for GSM operation, timing to maintain antenna resonance in the presence of proximal dielectrics (human body, tables, etc), band-selectable tuning (no sub bands in CDMA) to allow reduction of the antenna physical volume, and frequency, tuning to present a more constant impedance (better match) versus operating frequency, are all possible byproducts of the inclusion of tuning components.

Figure 24:
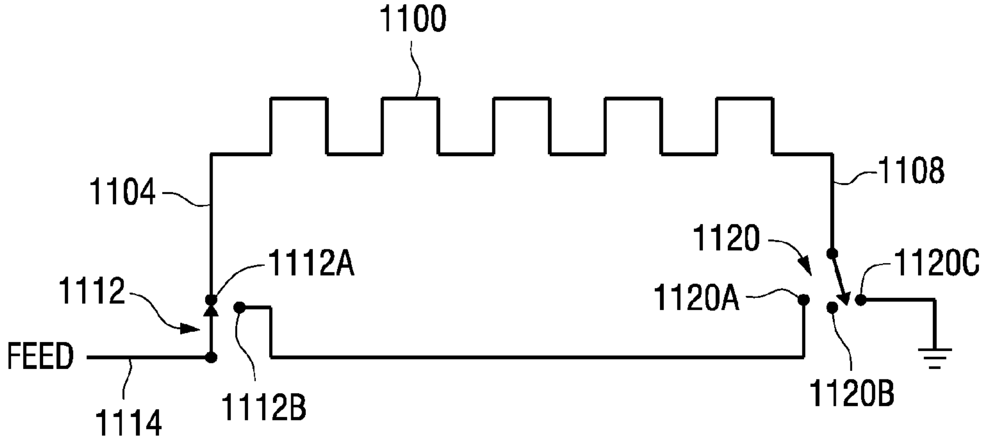
FIG. 24 is a schematic illustration of an antenna having feed points at spaced apart terminal ends according to the teachings of the present invention.

According to another antenna control embodiment of the present invention, antenna spatial diversity is achieved by selectively driving a radiating structure 1100, see FIG. 24, from either a terminal end 1104 or a terminal end 1108. A meanderline radiator structure is illustrated as merely an exemplary embodiment.

With a switch 1112 in a configuration represented by a reference character 1112A and a switch 1120 is in a configuration 1120B, a feed 1114 is coupled to the terminal end 1104, resulting in a current minimum at the terminal end 1108 and a current maximum at the terminal end 1104. Reconfiguring the switch 1112 to a configuration 1112B and configuring the switch 1120 closing the switch 1120 shifts the current maximum to the end 1108 and the current minimum to the end 1104. Changing the location of the current maximum and current minimum alters the antenna pattern (phase center) to achieve spatial diversity.

The switches 1112 and 1120 are controlled by control signals generated in other elements of the communications device. For example, if the signal-to-noise ratio of the received signal falls below an identified threshold (or the bit error rate of the received signal exceeds a predetermined threshold) the switch configurations are reversed in an effort to improve performance.

As described elsewhere herein, one embodiment of a conventional communications device operative with a single antenna employs a serial component string (signal path) comprising the power amplifier (and the low noise amplifier in the receiving mode), a switch plexor (for use with the GSM protocol) or duplexer (for use with the CDMA protocol) the antenna impedance controlling element and the antenna. The switch plexor or duplexer switches into the serial string of the appropriate power amplifier or low noise amplifier responsive to operating conditions.

It is known that an actual nominal antenna impedance can range between about 20 ohms and several ohms as a function of frequency over its operating bandwidth. The output impedance of the power amplifier is typically a few ohms (about 3 to 7 ohms and usually complex) and varies with output power as described above. To accommodate the impedance variations in the signal path and recognizing that in any case the impedance varies with frequency, the antenna impedance is transformed to an impedance that improves the power amplifier PAE. Specifically, the optimum impedance is selected from a locus of points that are generated as a function of the signal frequency supplied to the antenna and the commanded RF power output from the PA. The optimum impedance is the value that allows the power amplifier to operate at optimum PAE, i.e., producing an output signal that uses the available supply voltage/current without signal clipping or saturation.

Conventionally, the power amplifier impedance is transformed to about 50 ohms. It is therefore desired for the antenna to present a 50 ohm impedance (by transforming the antenna radiation resistance, typically about 15 ohms, to 50 ohms) such that when connected by a 50 ohm transmission line to the power amplifier, the antenna provides a satisfactory load for the PA. By utilizing 50 ohm interconnects in the signal path between the PA and the antenna, insertion and cascading of conventional filters and switching elements (and any other signal processing elements in the signal path such as bias circuits, RF connectors, transmission lines, transmit/receive switches) is facilitated and maximum power is transferred from the power amplifier to the antenna.

It is also known that large impedance transformations (e.g., 3 to 50 ohms) can reduce the signal bandwidth, where the bandwidth reduction is a direct function of the ratio of the two impedances. One known technique to overcome the bandwidth reduction employs multistage matching where the total impedance transformation is accomplished in sequential stages, each stage matching two impedances of a lower ratio than the ratio of the total impedance transformation, as described by the Fano matching criteria.

To overcome the effects of these impedance mismatches and impedance variations, according to one embodiment of the present invention the power amplifier output impedance is not transformed to 50 ohms, but instead to a value close to the antenna radiation resistance or to an intermediate value between 50 ohms and the PA output impedance. In another embodiment in which a alter is interposed between the power amplifier and the antenna, the impedances of both the power amplifier and the antenna are transformed to the filter impedance. Transforming to an impedance lower than 50 ohms reduces the concomitant bandwidth reduction as the ratio of the two impedances is lower.

Figure 25:
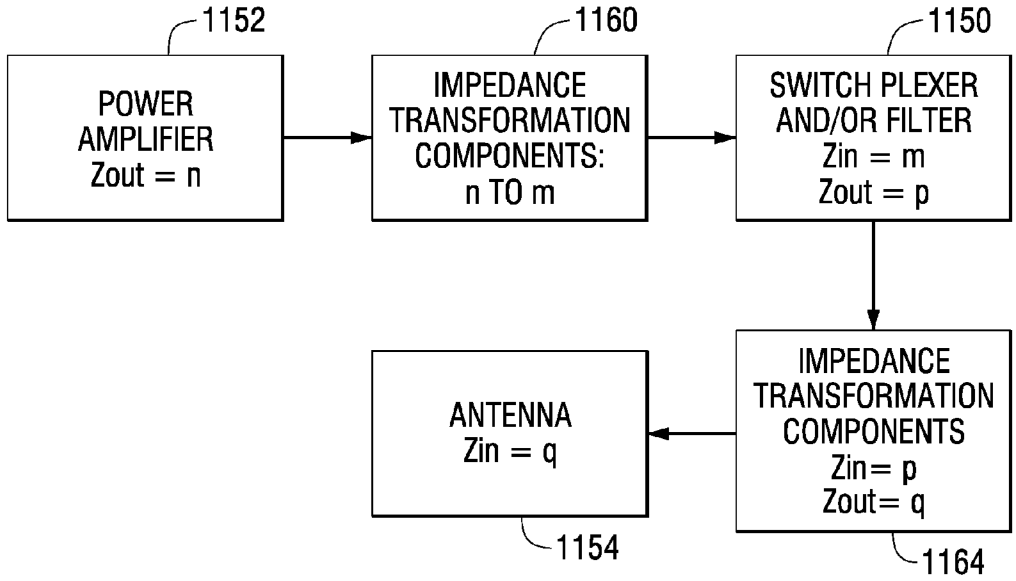
FIG. 25 is a block diagram illustration of a transmit signal path according to the teachings of the present invention.

FIG. 25 illustrates this aspect of the invention in which a alter and/or switch plexer 1150 is interposed between a power amplifier 1152 and an antenna 1154. Impedance transformation components 1160 transform the output impedance Zout=n of the power amplifier 1152 to an impedance m, wherein the switch plexer and/or filter 1150 has an input impedance Zin=m and an output impedance Zout=p. Impedance transformation components 1164 transform the impedance presented by the switch plexer and/or filter 1150 to the antenna input impedance Zin=q. Preferably all of the series equivalent characteristic impedance values, no m, p and q are less than 50 ohms. Therefore the bandwidth reduction associated with these impedance transformations is less than the prior art systems where all the impedances are transformed to 50 ohms. It is also possible to design an antenna to provide a closer impedance match to the output impedance of the PA, thereby eliminating the need impedance transform to an artificially specified value, thereby optimizing the performance of the PA, filter, switchplexer (or diplexer) and elements in the antenna chain. The benefit of this approach is lower loss in the transmission and receiving paths and greater bandwidth.

In a preferred embodiment, the various elements illustrated in FIG. 25 are formed as a radio frequency antenna/power amplifier module, comprising a dielectric material surrounding an integrated circuit, wherein the electronic components of the elements 1150, 1160 and 1164 are formed within the integrated circuit. A fixed pre-positioning of the PA 1152 relative to the other components included within the module provides the best performance for the modularized elements.

The filter components of the element 1150 may be implemented as passive components within the module, and therefore are not necessarily formed in the integrated circuit.

To improve the power amplifier's performance, a PA load impedance that improves the PAE over an appropriate bandwidth is determined. The impedance of one or more of the module elements is transformed to present that load impedance to the PA and the impedance transformation components 1160 and 1164 are controlled to match impedances between elements (except the PA 1152).

Figure 26:
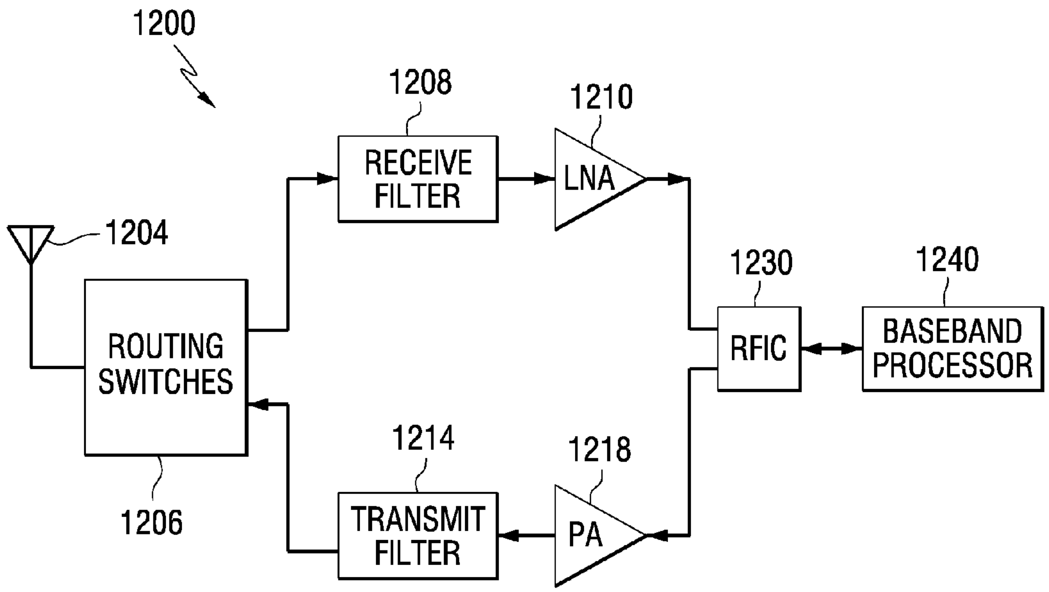
FIG. 26 is a block diagram of an antenna system and associated components for receiving and transmitting a communications signal.

Another embodiment of the present invention teaches modularization of a front end module (FEM) 1200 illustrated in block diagram form in FIG. 26. The FEM 1200 comprises an antenna 1204 and routing switches 1206. A receive path comprises a receive filter 1208 and a low nose amplifier 1210. A transmit path comprises a transmit filter 1214 and a power amplifier 1218. In another embodiment, the FEM 1200 further comprises the impedance transformation components illustrated in FIG. 24 for improving the bandwidth response of the FEM 1200.

The LNA 1210 and the PA 1218 are firer connected to an RF integrated circuit (RFIC) 1230 comprising conventional components associated with processing the outgoing signal in the transmit mode and the incoming signal in the receive mode, e.g., up and down frequency conversion, modulation and demodulation and signal frequency synthesis. A baseband processor 1240 decodes the baseband signal provided by the RFIC 1230 in the receive mode co produce the information signal. In the transmit mode, the baseband processor 1240 encodes the information signal and supplies the encoded signal to the RFIC 1230. In the receive mode, the baseband processor 1240 receives the baseband signal from the RFIC 1230, decoding same to produce the information signal.

Use of the FEM 1200 reduces time-to-market for the manufacturer of the communications device since the components and functionality are conveniently supplied in modular form. Reduced manufacturing costs (fewer components to inventory and track, simpler designs required) and manufacturing repeatability are also realized by use of the FEM 1200.

In one embodiment, the FEM 1200 incorporates the beneficial dynamically selected antenna impedance values for loading the PA at different power levels, thus improving PA operating PAE, as described above. PAE improvements, which have been shown by the inventors to be 10% to 20%, lengthen the handset "talk" time as battery life is extended.

The teachings of the present invention related to antenna impedance control can also be applied to control the VSWR of the signal provided by the PA to the antenna for transmission. An actual VSWR can be measured by known techniques and compared to a desired VSWR. The antenna impedance is controllable responsive to the actual VSWR to achieve the desired VSWR.

Figure 27:
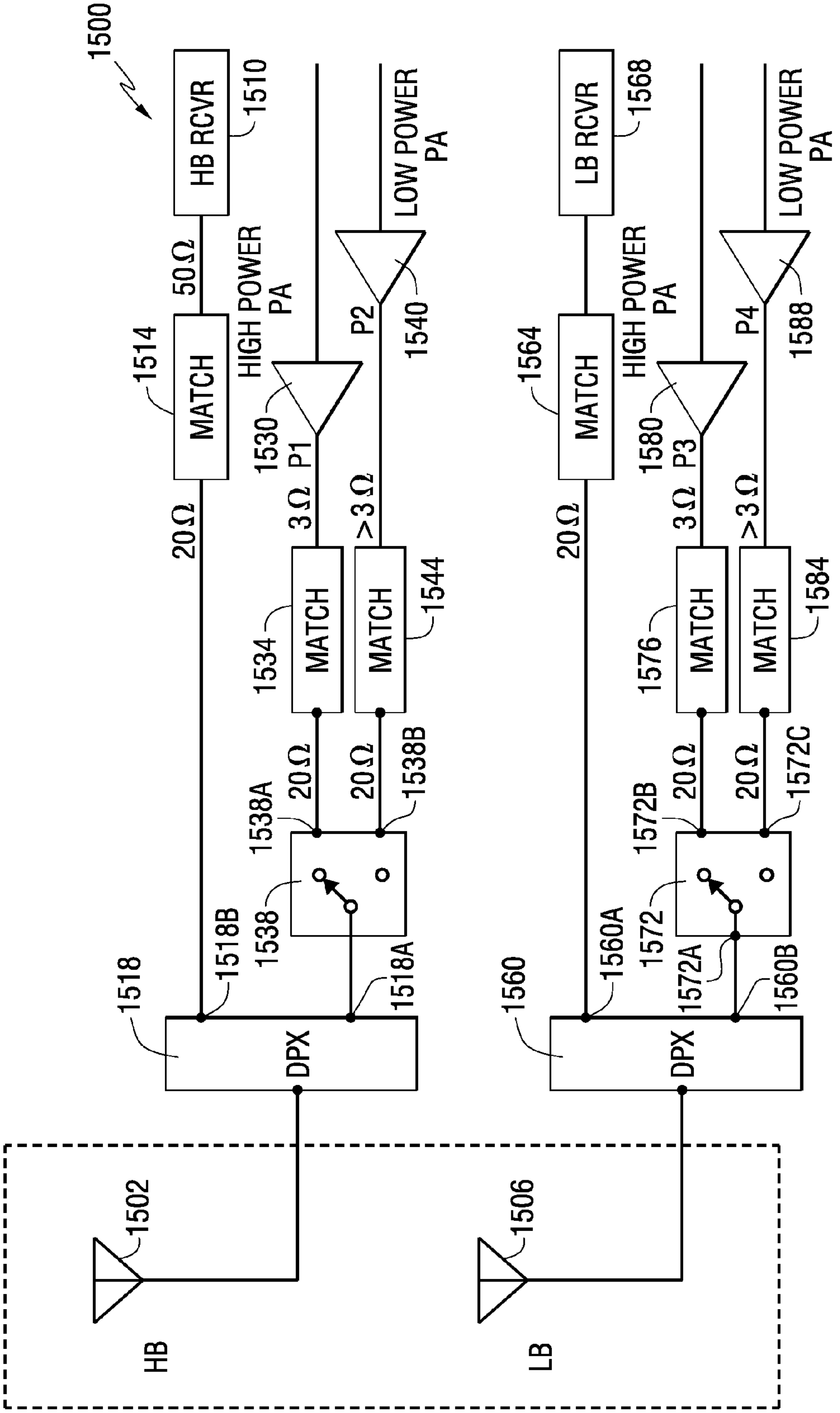
FIGS. 27-30 are block diagrams of various communications apparatuses for sending and receiving radio frequency signals according to different embodiments of the present inventions.
Figure 28:
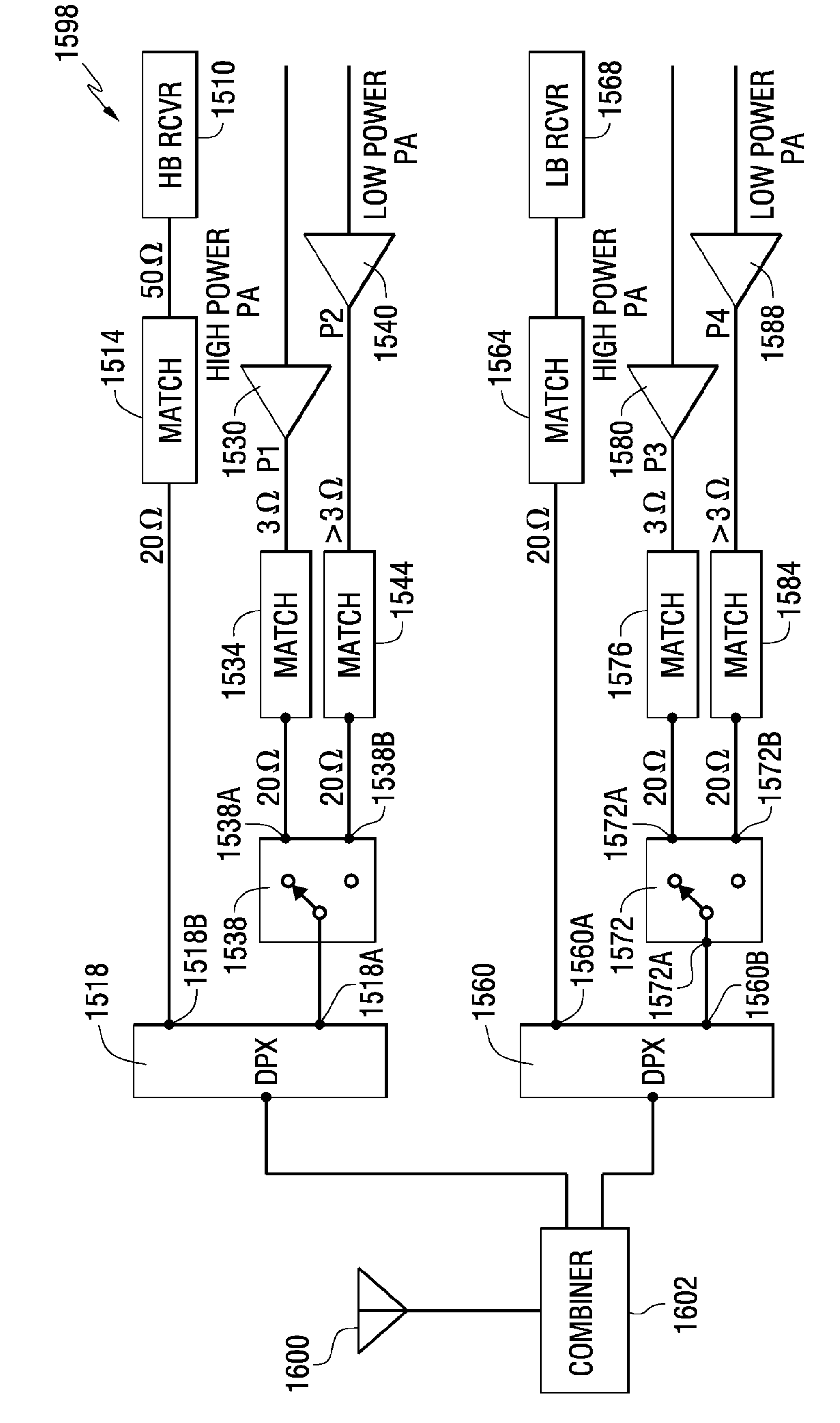
Figure 29:
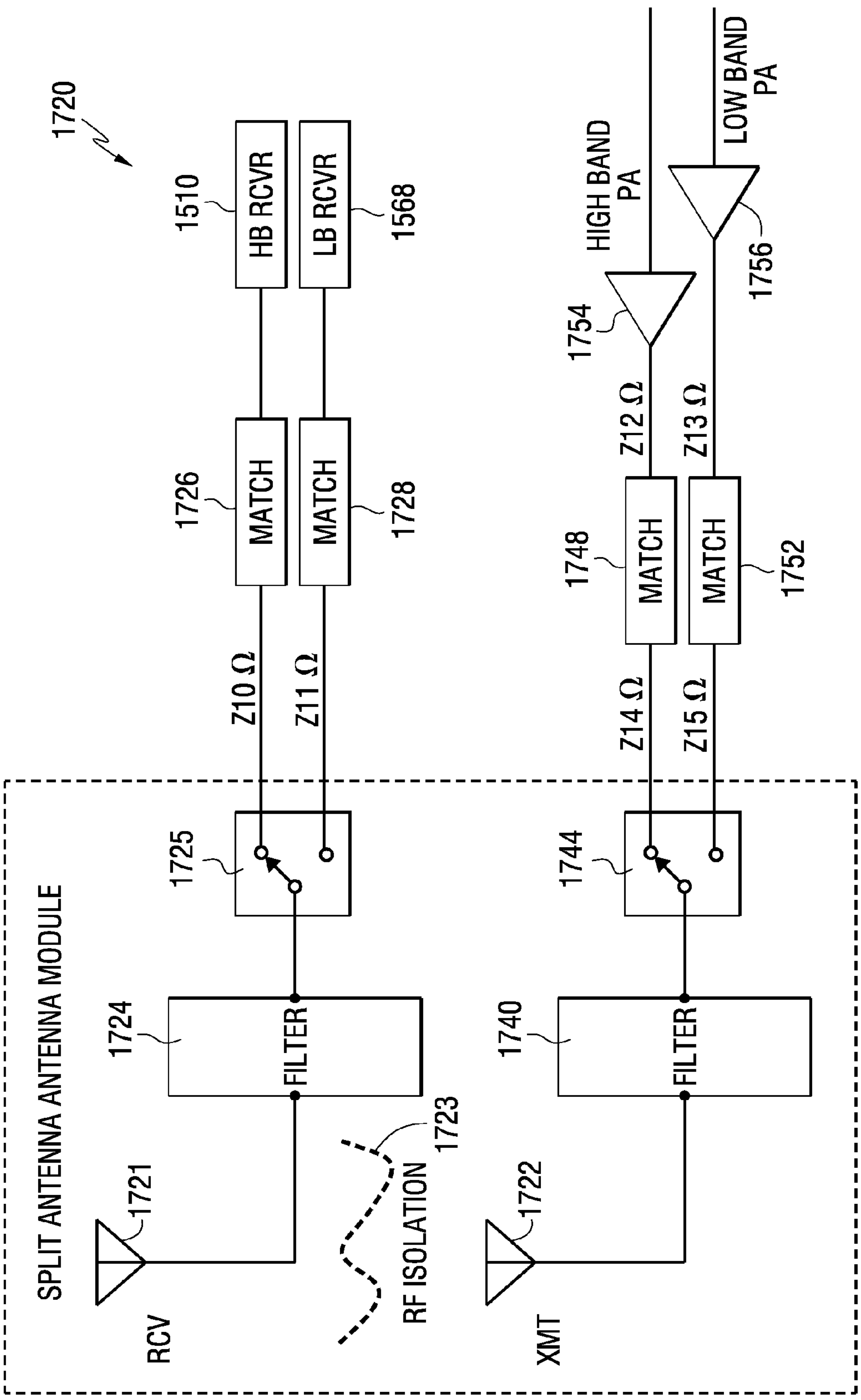
Figure 30:
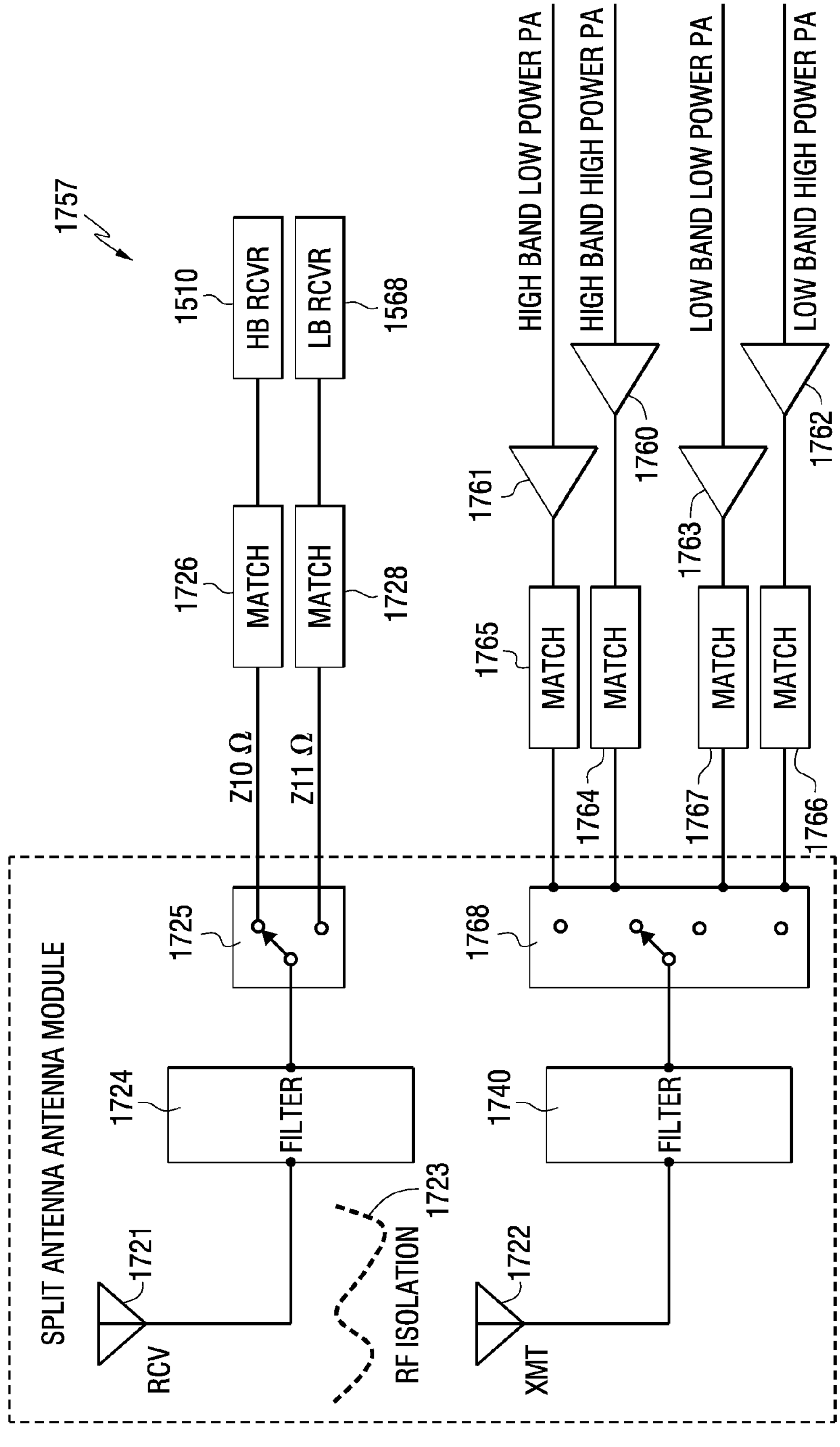
Figure 31:
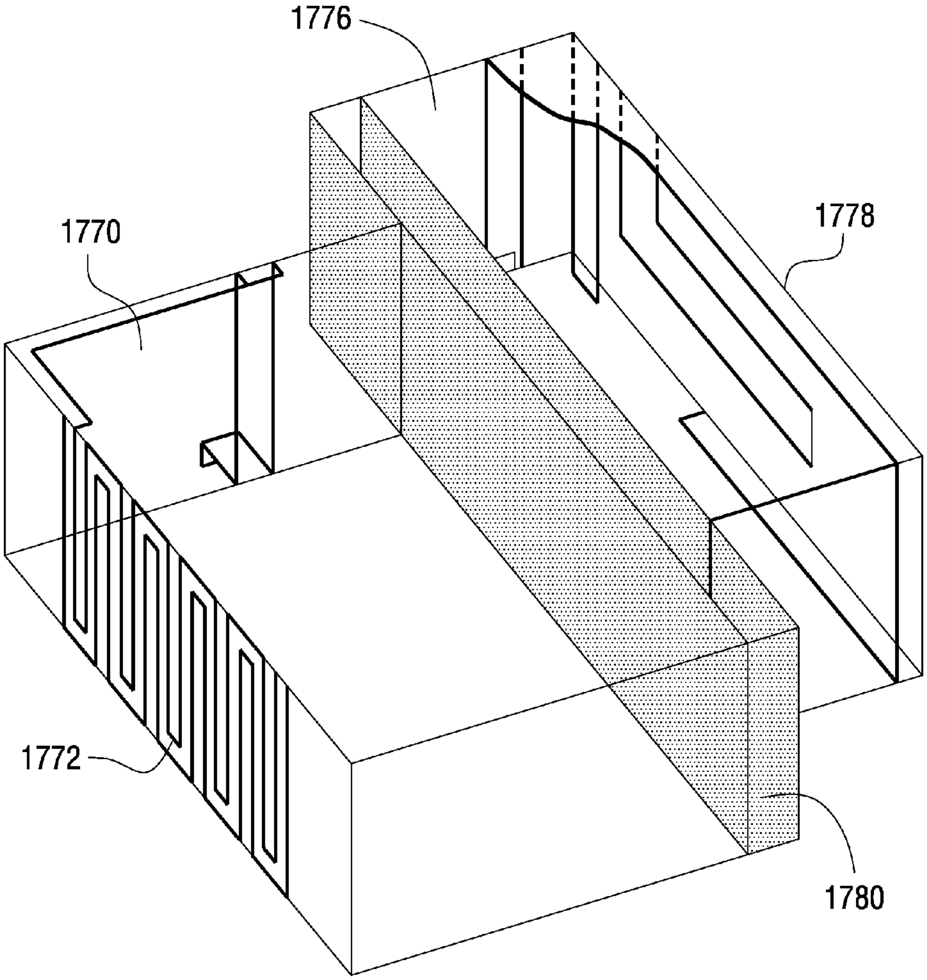
FIG. 31 illustrates a communications apparatus in modular form for sending and receiving radio frequency signals.
Figure 32:
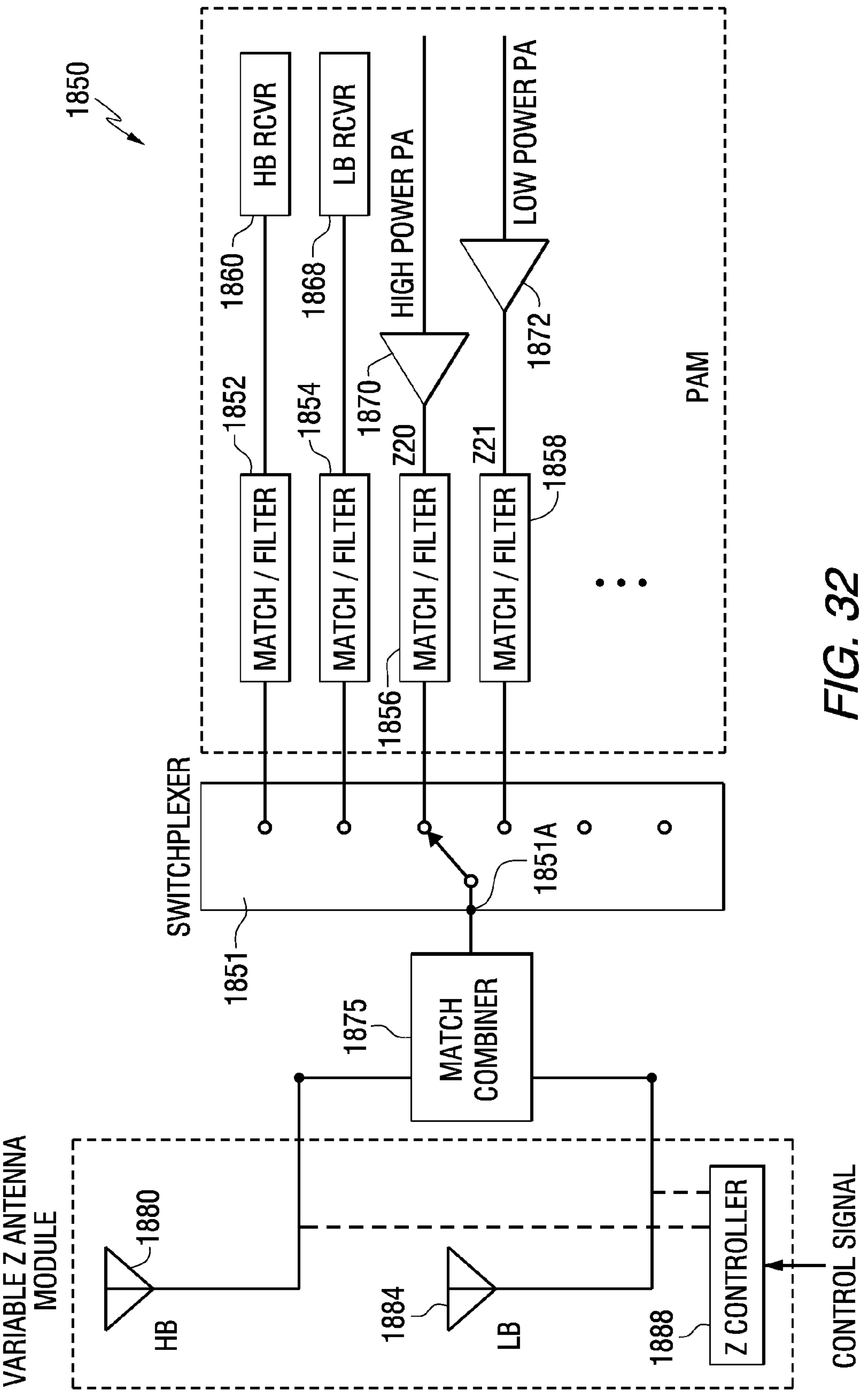
FIGS. 32-35 are block diagrams of communications apparatuses for sending and receiving radio frequency signals according to different embodiments of the present invention.

FIGS. 27-29 illustrate various antenna and related components suitable for use with a CDMA communications protocol; FIG. 30 illustrates an antenna isolation technique suitable for use with certain embodiments of the present invention; FIGS. 31 and 32 illustrate antennas and related components suitable for use with a GSM communications protocol.

FIG. 27 illustrates a transmitting and receiving system 1500 suitable for use with the CDMA air interface. The system 1500 comprises a high band antenna 1502 operative generally in the frequency bands of about 1850-1910 MHz (uplink) and 1930-1990 MHz (downlink) and a low band antenna 1506 operative generally in the frequency band of about 824-849 MHz (uplink) and 869-894 (downlink). As applied to the cellular and PCS services, a CDMA uplink signal is transmitted (for example from a handset to a base station) on one of the uplink frequencies and the downlink signal (for example from the base station to the handset) is transmitted on one of the downlink frequencies. Thus the system 1500 of FIG. 27 is capable of sending and receiving signals in either of the high or low frequency bands. But since the transmit and receive functions use the same antenna an isolating device (a duplexer for example) is required to isolate the transmit and receive paths.

A high band receiver 1510 is connected to the high band antenna 1502 via a serial connection of an impedance matching network 1514 and a duplexer 1518. In a preferred embodiment, the matching network 1514 matches the high band antenna impedance (as transformed through the duplexer 1518) to 50 ohms, since the high band receiver typically operates from a 50 ohm input. In the illustrative embodiment of FIG. 27, the matching network 1514 matches a 20 ohm antenna impedance to 50 ohms. Although the impedance matching network 1514 can be designed to accommodate matching of various impedance values, it is known that impedance matching tends to reduce the signal bandwidth in direct proportion to the difference between the two impedance values that are matched, unless complex multistage matching elements are employed.

The system 1500 further comprises a high-power amplifier 1530 (providing an output power P1) connected to the high band antenna 1502 via a serial string of a matching network 1534, a switch 1538 and the duplexer 1518. A low-power amplifier 1540 providing an output power P2) is also connected to the high band antenna 1502 via a serial string of a matching network 1544, the switch 1538 and the duplexer 1518. Depending on the power output level of the power amplifiers 1530 and 1540, the PA output impedance can range from about 3 ohms to about 2000 ohms.

As described above, the load impedance seen by the power amplifier affects the power amplifier efficiency. According to an embodiment of the invention described above, the impedance of an antenna connected to the PA is controlled to present an impedance that maximizes the PAE.

In the embodiment of FIG. 27, the power amplifier 1530 is selected as the operative power amplifier (responsive to a control signal not illustrated and configuration of the switch 1538 to a state 1538A) when a relatively high-power output signal is required for the effective communications in the high frequency band. The PA 1530 thus supplies a relatively high-power output signal P1. When supplying the signal P1, an exemplary load impedance of about 3 ohms maximizes the PAE of the power amplifier 1530. Thus it is desired for the matching network 1534 to transform the impedance seen looking into the switch 1538 (for example about 20 ohms as indicated in FIG. 27) to about 3 ohms to maximize the PAE of PA 1530.

For relatively low power operation in the high frequency band, the PA 1540 is operative, as controlled by a control signal not illustrated in FIG. 27 and configuration of the switch 1538 to a state 1538B, to deliver a low-power output signal P2. Due to the difference in the power of the signals P1 and P2, the optimum load impedance for maximizing the PAE of the PA 1540 is different than the optimum impedance for maximizing the PAE of the PA 1530. In the exemplary embodiment of FIG. 27, the impedance is indicated to be greater than about 3 ohms and can range to about 2000 ohms dependent on the power in the output signal P2. Thus the matching network 1544 transforms the exemplary switch/antenna impedance of about 20 ohms to the PA 1540 output impedance to maximize its PAE.

Although the power amplifiers 1530 and 1540 are described as supplying a discrete output power level P1 or P2 that determines the load impedance for maximum PAE, it is known by those skilled in the art that the teachings of the invention apply to other output power levels and output impedance values. In other embodiments of the invention, the power amplifiers operate to supply output signals having a power level different than the exemplary P1 and P2 power levels, and thus different load impedance values are required to optimize the PAE of the power amplifiers.

As is known, the duplexer 1518 must provide sufficient isolation between the signals present at its two input ports 1518A and 1518B, since according to the CDMA protocol the transmitting and receiving components may be simultaneously active. Thus duplexer isolation prevents the transmitted signal from bleeding into the receive components and the received signal from bleeding into the transmit components. When the system 1500 is operating in a receive mode, the duplexer 1518 must present a relatively high impedance at the terminal 1518A. Similarly, when the system 1500 is transmitting through the high band antenna 1502 a relatively high impedance is seen at the terminal 1518B.

The low-band antenna 1506 is similarly connected to a duplexer 1560 having a port 1560A connected to a serial sting of a matching network 1564 and a low-band receiver 1568. A port 1560B of the duplexer 1560 is connected to a common terminal 1572A of a switch 1572. A terminal 1572B of the switch 1572 is farther switchably connected to a serial string comprising a matching network 1576 and a high-power amplifier 1580 (supplying a relatively high-power output signal P3); a terminal 1572C is switchably connected to a serial string comprising a matching network 1584 and a low-power amplifier 1588 (supplying a relatively low-power output signal P4).

The matching networks 1576 and 1584 see the impedance of the low-band antenna as transformed through the duplexer 1560 and the switch 1572, and transform this impedance to increase the PAE of the operative high-power amplifier 1580 or the low-power amplifier 1588. In the presented exemplary embodiment a load impedance of about 3 ohms maximizes the PAE of the PA 1580 at the power level of the signal P3 and a load impedance of greater than about 3 ohms maximizes the PAE of the PA 1588.

The impedance values set forth in FIG. 27 (and all Figures presented herein) are merely exemplary, although it is expected that the output impedance of a low power amplifier (1540 and 1588) would be greater than the output impedance of a high power amplifier (1530 and 1580). The design of the high-band and low-band antennas, the duplexers, the receivers, the power amplifiers, and the switches all impact the impedances seen at the matching network terminals. Further, the power level of the power amplifier output signals determine the load impedance that maximizes the PA PAE. It is generally known, however, that duplexer size increases when designed to operate into a lower impedance load or source impedances. It is therefore preferable to use relatively large impedances in conjunction with the duplexers of FIG. 27 to maintain a reasonable duplexer size for use in a communications device, especially for use in hand held communications devices.

The matching networks 1514 and 1564 are both indicated as matching to a presented 20 ohm source impedance. But in another embodiment the high and low band antennas 1502 and 1506 may present different impedances at resonance and thus the matching networks 1514 and 1564 may see different source impedances for transformation to a suitable impedance for their respective receiver 1510 and 1568.

In one embodiment, each of the antennas 1502 and 1506 comprises an antenna presenting a relatively low impedance. In this embodiment signal bandwidth loss is reduced compared with an embodiment employing antennas that present a 50 ohm impedance at resonance. Since the impedance seen from the input terminal of each of the matching networks 1534, 1544, 1576 and 1584 is lower when low impedance antennas are used, the difference between the input and output impedances is reduced and the bandwidth of the impedance transformation is therefore increased. In another embodiment the antenna impedance is switched between receive and transmit functions to reduce the impedance transformation ratio required between the antenna and the receiver.

Preferably, the switches 1538 and 1572 present a sufficiently low resistance to limit the power losses they introduce into the signal path.

The matching networks 1514, 1534, 1544, 1576 and 1584 (and other matching networks illustrated in the various Figures) may comprise both impedance transformation components and signal filter components. Further, the receivers 1510 and 1568 (and the other receivers illustrated in the various Figures) may comprise both receiver and filter functionalities.

In one embodiment, the components illustrated in FIG. 27 are fabricated in a modular form, with the electronics components disposed within a dielectric substrate and the antenna components disposed on outer surfaces of the substrate.

FIG. 28 illustrates a system 1598 sharing certain common elements with the system 1500 of FIG. 27 and suitable for CDMA operation. As can be seen, the system 1598 comprises a single antenna 1600 connected to the duplexers 1518 and 1560 through a combiner 1602, which in one embodiment is an element of the antenna structure. Operation of the combiner 1602 is frequency dependent such that high band received signals are supplied from the antenna 1600 to the duplexer 1518 and low band received signals are supplied from the antenna to the duplexer 1560. Depending on the operating frequency and the signal power required, one of the high-power amplifiers 1530 and 1580 (preferably optimized for supplying a signal in the high-band spectrum) or the low-power amplifiers 1540 and 1588 preferably optimized for supplying a signal in the low-band spectrum) can supply a signal to the combiner (through their respective duplexers 1518 and 1560) for transmission by the antenna 1600.

FIG. 29 illustrates a system 1720 including a receive antenna 1721 and a transmit antenna 1722 appropriately isolated by an isolation structure 1723 as farther described below. Either the high-band receiver 1510 or the low-band receiver 1568 is connected to the receiving antenna 1721 via a filter 1724, a switch 1725 and respective matching networks 1726 and 1728. The matching networks may be required to match an impedance of the receivers 1510 and 1568 (which may not be identical) to a source impedance seen looking into the switch 1725. Since the receive antenna will likely present a first impedance when operating in the high frequency band and a second different impedance when operating in the low frequency band, the matching networks 1726 and 1728 typically match to different impedance values Z10 and Z11 ohms as indicated.

As can be appreciated, the system 1720 is applicable to CDMA systems where the switch 1725 is controlled to a state to receive signals depending upon whether the signal is in the CDMA high band (1930-1990 MHz) or the CDMA low band (869-894 MHz).

A filter 1740, a switch 1744 and respective matching networks 1748 and 1752 are responsive to a signal supplied by a high-band power amplifier 1754 and by a low-band power amplifier 1756:

The frequency-dependent filters 1724 and 1740 can provide additional isolation between the receive and transmit operating frequencies, i.e., in addition to the isolation provided by the isolation structure 1723.

The power amplifiers 1754 and 1756 may operate at different output power levels and therefore to maximize the PAE they may be operated at different load impedances, Z12 and Z13 ohms as indicated in FIG. 29. Thus the matching network 1748 transforms an impedance of Z14 ohms to Z12 ohms for the high band-power amplifier 1754 and the matching network 1752 transforms an impedance of Z15 ohms to Z13 ohms for the low-band power amplifier 1756. Typically, the transmit antenna 1722 presents a high-band impedance when operating at a high-band frequency and a different low-band impedance when operating at a low-band frequency. Thus the impedances Z14 and Z15 may not be equal.

In another embodiment of the invention, the matching networks 1748 and 1752 are controllable to present different load impedances to the power amplifiers 1754 and 1756 to optimize or at least improve the PAS of each power amplifier 1754 and 1756 (i.e., improve the PAE or efficiency over the efficiency absent use of the controllable matching networks 1748 and 1752.)

In one embodiment of the system 1720, the transmit and receive antennas 1721 and 1722, the filters 1723 and 1740, and the switches 1724 and 1744 can be incorporated into a single antenna module. In another embodiment, only the receive and transmit antennas 1721 and 1722 are incorporated into the module.

FIG. 30 illustrates a system 1757 derived from the system 1720 of FIG. 29 and further comprising a high-band high-power PA 1760, a high-band low-power PA 1761, a low-band high-power PA 1762 and a low-band low-power PA 1763 and their respective matching networks 1764, 1765, 1766 and 1767. A switch 1768 selectably connects one of the PA's 1760, 1761, 1762 and 1763 to the transmit antenna 1722 via the filter 1740. As in the embodiments discussed elsewhere herein, the matching networks 1764, 1765, 1766 and 1767 are configured (either a fixed or a controllable configuration) to provide a load impedance to the PA's 1760, 1761, 1762 and 1763 to maximize the PAE of each PA according to the operating power level (or another power-related parameter, for example, a power amplifier output power, an operating frequency of a communications device operative with the system 1757 wherein operation of the power amplifiers is responsive to the operating frequency of the communications device or a voltage standing wave ratio on a conductive path between the power amplifier and the transmitting antenna) of the PA.

FIG. 31 illustrates an example of the isolation structure 1723 of FIGS. 29 and 30. A dielectric substrate 1770 supports an antenna 1772 (in this exemplary embodiment the antenna 1772 comprises a meanderline antenna) and a dielectric substrate 1776 supports an antenna 1778 (in this exemplary embodiment the antenna 1778 comprises a PIFA antenna). An isolation structure comprises a conductive structure 1880 disposed between the substrates 1770 and 1776. In the illustrated embodiment the conductive structure comprises a generally U-shaped conductive structure. In another embodiment (not illustrated) the conductive structure comprises a sheet disposed between the substrates 1770 and 1776. In still another embodiment (not illustrated) the substrates 1770 and 1776 are replaced by a dielectric sheet (a flex film dielectric sheet, for example) with a conductive surface sandwiched between the dielectric sheets. The antennas 1772 and 1778 are disposed on outside surfaces of the dielectric sheets.

In another embodiment of the systems 1720 and 1757 of FIGS. 29 and 30, isolation between the receive and transmit antennas 1721 and 1722 is provided by signal polarization diversity, i.e. the two antennas 1721 and 1722 propagate signals with different signal polarizations to achieve the desired isolation. For example, a first antenna propagating a horizontally polarized signal and a second antenna propagating a vertically polarized signal may provide the desired signal isolation in lieu of the isolation structure 1723 in FIGS. 29 and 30.

A system 1850 of FIG. 32 is suitable for use with any protocol employing a time division multiple access scheme, such as the GSM protocol, to separate transmit and receive operations. A switchplexer 1851 comprises a plurality of selectable terminals each responsive to a matching network/filter 1852, 1854, 1856 and 1858. The matching network/filter 1852 and 1854 are responsive respectively to a high-band receiver 1860 and a low-band receiver 1868. In another embodiment (not illustrated) the system 1850 further comprises a GPS receiver. The matching network/filters 1856 and 1858 are responsive respectively to a high-power amplifier 1870 and a low-power amplifier 1872. In another embodiment the PA's 1870 and 1872 are combined (e.g., using CMOS (complimentary metal oxide semiconductor field effect transistors) technologies) with a corresponding single matching network/filter configuration.

When the system 1850 is operative with a communications device, a configuration of a switch common terminal 1851A is controlled according to the operational mode (receive or transmit) and the operating frequency (high band or low band) of the communications device. The common terminal 1851A is connected to a matching network/combiner 1875 to supply the selected signal to antennas 1880/1884 in the transmit mode or to receive signals from the antennas 1880/1884 in the receive mode. The matching network/combiner 1875 may comprise a high and low pass filter to direct the high and low band frequency signals as desired. Alternatively, the functionality of the matching network/combiner 1875 can be integrated with the antennas 1880 and 1884 using parasitic coupling or direct coupling of different resonant antenna elements.

In the receive mode the matching network/combiner 1875 supplies the received signal to the common terminal 1851A of the switchplexer 1851 for feeding to either the high-band receiver 1860 via the matching network/filter 1852 or to the low-band receiver 1868 via the matching network/filter 1854, as determined by the state of the switchplexer 1851. The matching networks/filters 1852 and 1854 transform the source impedance they see to the input impedance of the respective receivers 1860 and 1868.

In the transmitting mode, the signal to be transmitted is supplied from either the high-power PA 1870 or the low power PA 1872. Based on their operating output power, the maximum PAE of the power amplifiers 1870 and 1872 is achieved when the load impedance is Z20 and Z21 ohms, as indicated, respectively. The matching network/filter 1856 provides the load impedance of Z20 ohms to the PA 1870 by transforming its source impedance (as seen looking into the switchplexer 1851 from the matching network/filter 1856) to Z20 ohms. Similarly, the matching element/filter 1858 presents a load impedance of Z21 ohms by transforming its source impedance (as seen looking into the switchplexer 1851 from the matching network/filter 1858) to Z21 ohms.

Within the system 1850, an impedance of each antenna 1880 and 1884 is controllable responsive to an antenna impedance controller 1888 further responsive to a control signal. As described above, controlling the antenna impedance to provide an optimal load impedance for the power amplifiers 1870 and 1872 improves the power amplifier efficiency and hence extends battery life of the communications device in which the system 1850 is embedded. The control signal can be derived from a baseband controller representative of the PA output power or by a band select signal that identifies the currently operative band for the communications device. In one embodiment the antennas 1880 and 1884 are formed on a common substrate or formed on separate substrates and bonded together, forming an antenna module. The antenna module may be referred to as a viable impedance antenna module since the impedance controller 1888 controls the impedance presented by the antennas 1880 and 1884.

Thus several techniques are presented for controlling the load impedance of the PA's 1870 and 1872 to maximize the PAE. Each of the matching networks/filters 1856 and 1858 can be controlled in real time responsive to the output power of the respective PA to achieve a desired or maximum PAE. Alternatively, each of the matching networks/filters 1856 and 1858 can provide a fixed load impedance for the respective PA that will maximize the PAE based on an average or expected value of the output power. Alternatively, the matching networks/filters 1856 and 1858 operate as band pass filters and provide a fixed impedance suitable for the switchplexer 1851, while the antenna controller 1888 presents an impedance to maximize the PAE.

Thus to improve the efficiency of the power amplifiers 1870 and 1872, the load impedance of each can be controlled by operation of the respective matching network/filter 1856 and 1858. Further, the antenna impedance can be controlled by the impedance controller 1888 to present a different source impedance to the matching networks/filters 1856 and 1858, which in turn transform the source impedance to a PA load impedance to maximizes the PAE for each PA 1870 and 1872.

The number of receiving and transmitting elements in the system 1850 can be easily extended as indicated. In one embodiment, the receivers, power amplifiers and matching networks/filters can be manufactured in the form of a module.

Figure 33:
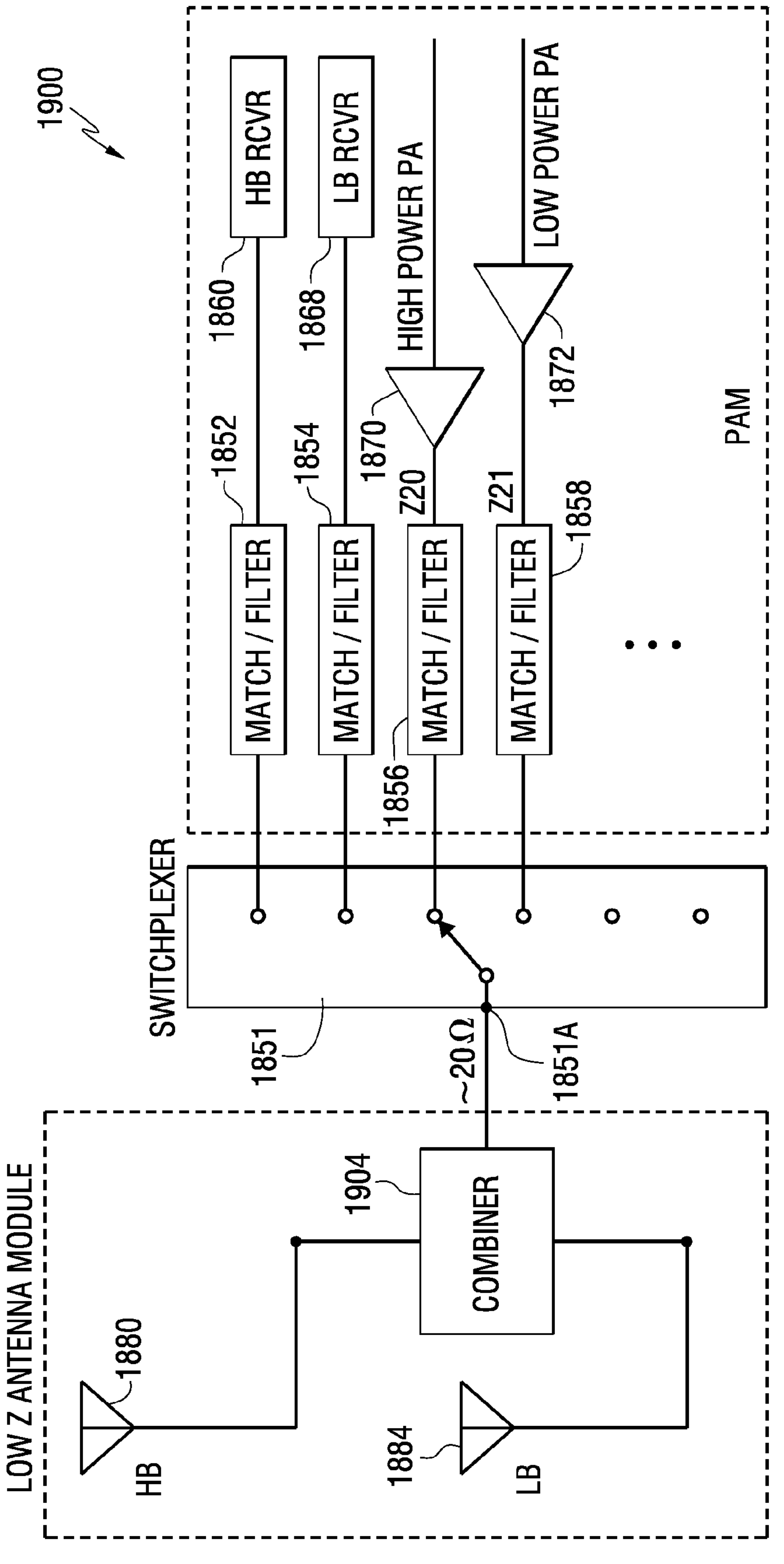

FIG. 33 illustrates a system 1900 sharing common elements with the system 1850 of FIG. 32. In one embodiment, the system 1900 employs a non-50 ohm signal transmission chain as indicated by the exemplary "~20Ω" designation between the switchplexer common teal 1851A and a combiner 1904. Antennas presenting such a "low" impedance are referred to as low impedance antennas and are capable of providing a low impedance over their operating bandwidth. In one embodiment the antennas 1880 and 1884 are formed on a common substrate or formed on separate substrates and bonded together, forming an antenna module. The antenna module may be referred to as a low impedance antenna module.

In the receiving mode the matching networks/filters 1852 and 1854 transform their source impedance to the load impedance for the high-band and low-band receivers 1860 and 1868. Also, the matching networks 1856 and 1858 can transform their source impedance to a load impedance that controls or maximizes the PAE (or efficiency) for the respective power amplifier 1870 and 1872. Further, in one embodiment the matching networks/filters 1856 and 1858 provide a controllable range of impedance transformations to provide a range of load impedances for the power amplifiers 1870 and 1872.

Certain elements within the various embodiments presented in FIGS. 27-33 can be formed or implemented in a module by forming or mounting multiple components on a common substrate. In particular, the high and low band antennas 1880 and 1884, the combiner 1875 and the impedance controller 1888 of FIG. 32 can be physically combined Into a modular element. Similarly, the high band antenna 1880, the low band antenna 1884 and the combiner 1904 can be combined to form a module in the embodiment of FIG. 33. The switchplexer 1851 can also be included within the module. As those skilled in the art recognize, other elements (switches and filters, for example) can be included within such a module to simplify design and assembly of the presented systems.

The modular implementation provides fixed interconnections and parts placement that avoids performance degradation from transmission line (conductor) lengths variations, alter characteristic variations and parasitic effects due to coupling between components. Component characteristics are matched at the time of module design, thereby limiting mismatch losses. The fixed phase shift through the radio frequency component chain at each operating frequency is known and can be compensated as required. The fixed phase shift is also beneficial for PA stability over presented mismatches due to environmental effects and changes (e.g., the proximity effect).

The module's radio frequency portion (i.e., the front end where many of the physical layout-induced performance variations arise) offers known performance characteristics, reducing design time of the communications device and therefore time to market.

In certain industrial designs (e.g., laptop computers) the modular approach can reduce transmission line length, and thus losses in the transmission lines, as the antenna(s) and power amplifier(s) are located in proximate relationship. A high-speed bus (such as an optical fiber) can be used to supply the signal to be transmitted from the baseband/modulating components to the power amplifiers.

Thus the modularized system offers the communications device designer a physically stable and operationally predictable component for insertion into a communications device.

Although the power amplifiers of the various presented embodiments have been described as supplying a signal having a discrete output power level (e.g., signals P1 and P2) that determines the load impedance for maximum PAE, the teachings of the invention are not so limited and can be applied to other output power levels and to power amplifiers capable of supplying a signal having a power within a range of power levels. The load impedance that maximizes the PAE is different dependent on the PA output power of the power amplifier. Therefore, the various presented matching networks, if capable of transforming only a single source impedance to an output impedance may not assure a maximum PAE at all output power levels. In another embodiment a matching network that can transform the source impedance to a selectable output impedance may be preferred to maximize the PAE at all possible PA output power levels.

Figure 34:
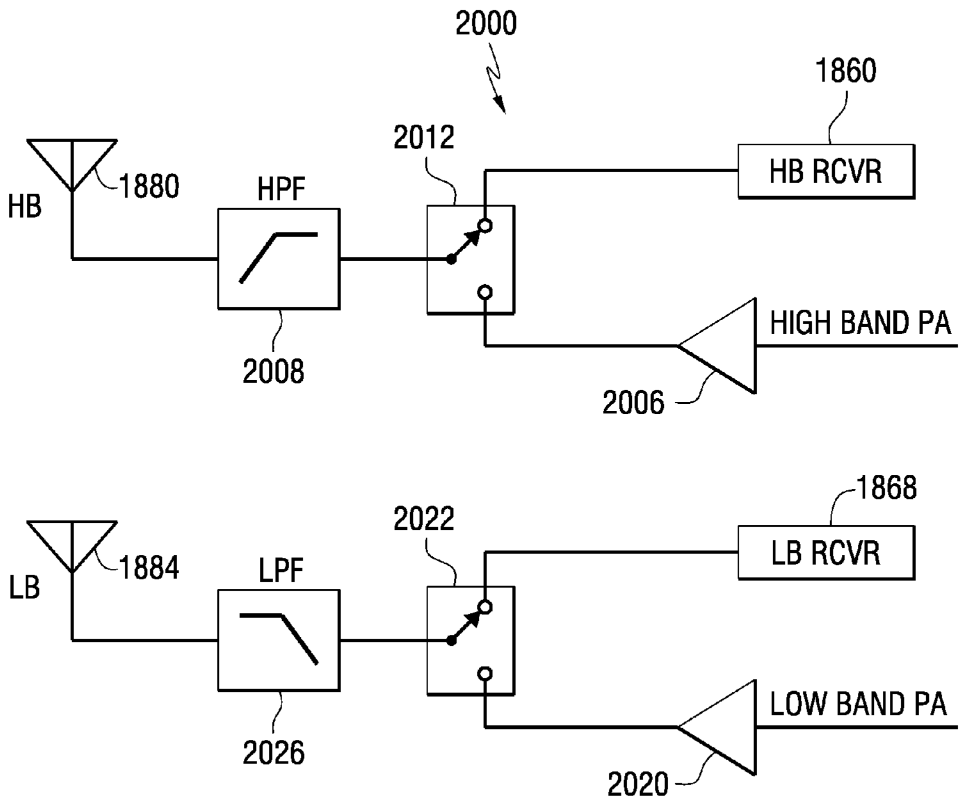

FIG. 34 illustrates a dual band communications apparatus 2000 comprising the high band receiver 1860 and a high band power amplifier 2006 selectably connected to a high pass filter 2008 via a transmit/receive switching element 2012. Responsive to a condition of the switching element 2012, the antenna 1880, connected to the filter 2008, supplies a received signal to the high band receiver 1860 or transmits a signal supplied by the power amplifier 2006. When incorporated into a multiband communications device, the operating mode of the communications apparatus 2000 (and the condition of the switching element 2012) is controlled by a signal representing the operating mode (receiving or transmitting) of the communications device.

For low band operation, the communications apparatus 2000 hurter comprises the low band receiver 1868, a low band power amplifier 2020, a switching element 2022, a low pass filter 2026 and the low band antenna 1884. The components associated with low band operation operate similarly to those associated with high band operation as described above.

Use of the filters 2008 and 2026 and the dedicated high band and low band antennas 1880 and 1884 in the communications apparatus 2000 avoids the need for a switchplexer, such as the switchplexer 1851 illustrated in FIG. 32. The switchplexer is a relatively expensive element and therefore its elimination is a cost reduction (and space reduction) advantage, especially for low-cost communications apparatuses. Additionally, use of the high band and the low band antennas 1880 and 1884, respectively, allows each to be designed for optimum performance in its operating band.

Preferably, each antenna 1880 and 1884 is designed for a 50 ohm match within its operating band. Typically, the power amplifiers 2006 and 2020 prefer a low load impedance and the receivers 1860 and 1868 prefer a higher (source) impedance. In the embodiment of FIG. 34, the high band receiver 1860 and the high band power amplifier 2006 are matched to a fixed impedance of 50 ohmns of the antenna 1880 and any intervening components, such as the filter 2008 and the switching element 2012. Similarly, the low band receiver 1868 and the low band power amplifier 2020 are matched to a fixed impedance of 50 ohms of the antenna 1884 and any intervening components, such as the filter 2026 and the switching element 2008.

In yet another embodiment, the impedance presented by the antennas 1880 and 1884 are controllable, for example by use of the impedance controller 1888 of FIG. 32, to control the load impedance presented to the respective power amplifier 2006 and 2020 to control the efficiency of the power amplifiers 2006 and 2020.

Figure 35:
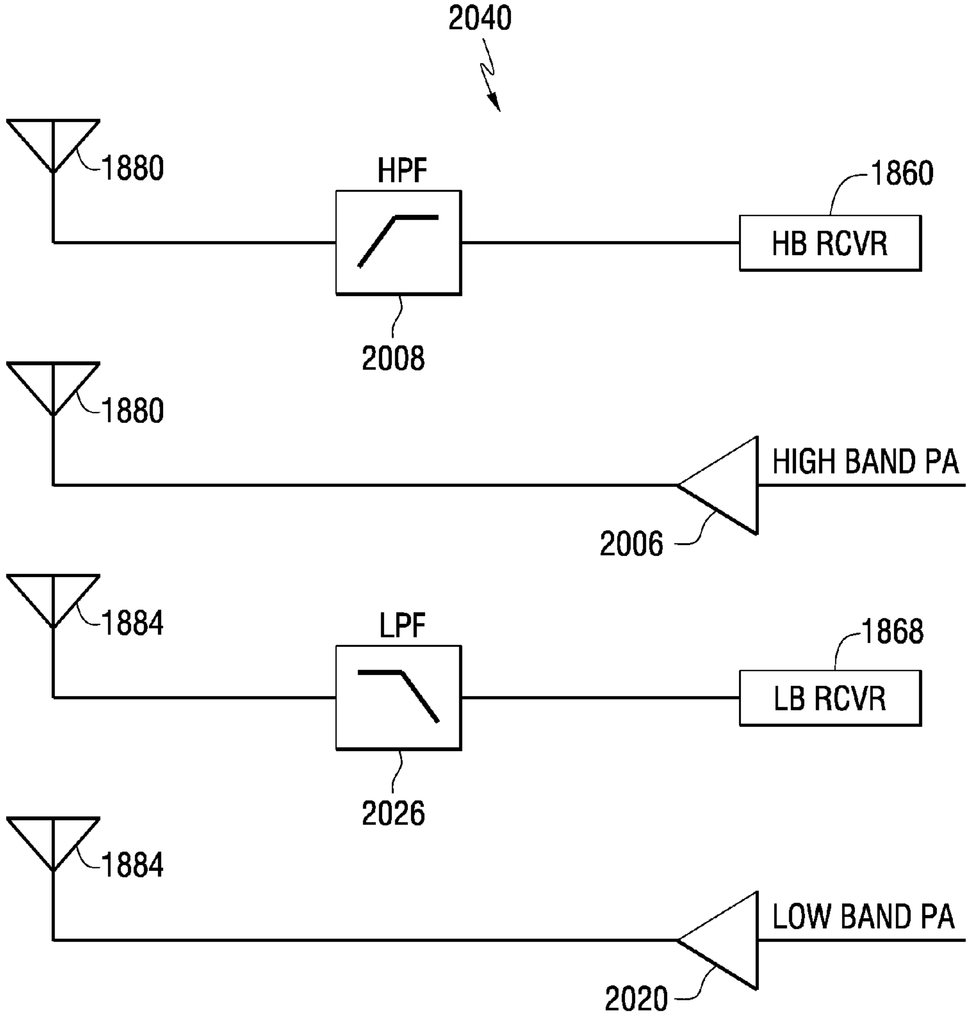

FIG. 35 illustrates a communications apparatus 2040 comprising two high band antennas 2008 (one for transmitting and one for receiving), two low band antennas 1884 (one for transmitting and one for receiving), the high pass filter 2008 and the low pass filter 2026. The four antennas and respective filters provide an equivalent functionality to the diplexer/switchplexer and the switches of the embodiments described above and can be optimized for performance with the associated power amplifier or receiver. Another embodiment includes the impedance controller 1888, to control the impedance of the antennas 1880 and 1884 as presented to the respective power amplifier 2006 and 2020 to control the efficiency of the power amplifiers 2006 and 2020.

The presented embodiments describe the inventions with reference to the GSM and CDMA air protocols, and in particular, the receivers) power amplifiers, antennas, etc., are described as operating according to those protocols. But the inventions are not limited to those protocols, as the teachings can extended for use with EGSM, PCS and DCS, 802.11x and other protocols.

While the present invention has been described with reference to preferred embodiments, it will be understood by those skilled in the art that various changes may be made and equivalent elements may be substituted for the elements thereof without departing from the scope of the invention. The scope of the present invention further includes any combination of elements from the various embodiments set forth herein. In addition, modifications may be made to adapt a particular situation to the teachings of the present invention without departing from its essential scope. Therefore, it is intended that the invention not be limited to the particular embodiments disclosed, but that the invention will include all embodiments falling within the scope of the appended claims.

What is claimed is:

1. A communications apparatus comprising:

a first antenna;

a first serial configuration of a first power amplifier and a first matching network;

a second serial configuration of a second power amplifier and a second matching network;

a switching element for switchably selecting the first or the second serial configuration for supplying a signal to the first antenna;

the first and the second power amplifiers supplying a respective first signal of a first power and a second signal of a second power different than the first power to the first antenna for transmitting;

the first and the second matching networks presenting respective first and second impedances to the respective first and second power amplifiers, the first and the second impedances responsive respectively to a power-related parameter of the first and the second signals;

a second antenna;

a third serial configuration of a third power amplifier and a third matching network;

a fourth serial configuration of a fourth power amplifier and a fourth matching network;

a second switching element for switchably selecting the third or the fourth serial configuration to supply a signal to the second antenna;

the third and the fourth power amplifiers supplying a respective third signal of a third power and a fourth signal of a fourth power different than the third power to the second antenna for transmitting;

the third and the fourth matching networks presenting a respective third and fourth impedance to the third and the fourth power amplifiers, the third and the fourth impedances responsive respectively to the third power and the fourth power; and the first antenna operating in a first frequency band and the second antenna operating in a second frequency band different than the first frequency band.

2. The communications apparatus of claim 1 further comprising a first receiver selectably responsive to the first antenna and a second receiver selectably responsive to the second antenna.

3. A communications apparatus comprising:

an antenna;

a signal combiner;

a first serial configuration of a first power amplifier and a first matching network;

a second serial configuration of a second power amplifier and a second matching network;

a first switching element for switchably selecting the first or the second serial configuration to supply a signal to the antenna through the signal combiner;

the first and the second power amplifiers supplying a respective first transmitted signal of a first power and a second transmitted signal of a second power different than the first power to the antenna for transmitting;

the first and the second matching networks presenting respective first and second impedances to the first and second power amplifiers, the first and the second impedances responsive respectively to a power-related parameter of the first and the second transmitted signals;

a first receiver for receiving a first received signal from the signal combiner;

a third serial configuration of a third power amplifier and a third matching network;

a fourth serial configuration of a fourth power amplifier and a fourth matching network;

a second switching element for switchably selecting the third or the fourth serial configuration to supply a signal to the antenna through the signal combiner;

the third and the fourth power amplifiers supplying a respective third transmitted signal of a third power and a fourth transmitted signal of a fourth power different than the third power to the antenna for transmitting;

the third and the fourth matching networks presenting respective third and fourth impedances to the third and the fourth power amplifiers, the third and the fourth impedances responsive respectively to the third and the fourth power;

a second receiver for receiving a second received signal from the signal combiner; and the first and the second transmitted signals and the first received signal in a first frequency band and the third and the fourth transmitted signals and the second received signal in a second frequency band.

* * * * *